(12) United States Patent
Kee

(10) Patent No.: US 10,993,382 B2
(45) Date of Patent: May 4, 2021

(54) MODULAR GREENHOUSE ASSEMBLY

(71) Applicant: Stephen Kee, Cuyahoga Falls, OH (US)

(72) Inventor: Stephen Kee, Cuyahoga Falls, OH (US)

(*) Notice: Subject to any disclaimer, the term of this patent is extended or adjusted under 35 U.S.C. 154(b) by 347 days.

(21) Appl. No.: 16/011,253

(22) Filed: Jun. 18, 2018

(65) Prior Publication Data

US 2019/0380284 A1  Dec. 19, 2019

(51) Int. Cl.
*A01G 9/16* (2006.01)
*A01G 9/24* (2006.01)

(52) U.S. Cl.
CPC ............... *A01G 9/16* (2013.01); *A01G 9/246* (2013.01)

(58) Field of Classification Search
CPC ... A01G 9/14; A01G 9/16; A01G 9/24; A01G 31/06; A01G 9/246; A01G 9/249; E04B 1/0023
USPC .................................................. 47/17
See application file for complete search history.

(56) References Cited

U.S. PATENT DOCUMENTS

| | | | | |
|---|---|---|---|---|
| 4,035,949 A * | 7/1977 | Ruthner | ............. | A01G 31/02 47/17 |
| 4,047,328 A * | 9/1977 | Kehl | ............. | A01G 9/246 47/59 R |
| 4,152,752 A * | 5/1979 | Niemi | ............. | F21S 2/00 362/576 |
| 6,446,385 B1 * | 9/2002 | Crutcher | ............. | A01G 9/18 47/17 |
| 8,479,461 B2 * | 7/2013 | Lanham | ............. | H05B 47/10 52/200 |
| 8,984,806 B2 * | 3/2015 | Uchiyama | ............. | A01G 31/06 47/17 |
| 9,591,815 B2 * | 3/2017 | Fujiyama | ............. | A01G 9/00 |
| 9,730,400 B2 | 8/2017 | Wilson et al. | | |
| 10,219,447 B1 * | 3/2019 | DeCarli | ............. | E04H 5/08 |
| 2007/0266652 A1 * | 11/2007 | Jaster | ............. | E04D 13/03 52/200 |
| 2008/0000151 A1 * | 1/2008 | Houweling | ............. | A01G 9/14 47/17 |
| 2008/0216398 A1 * | 9/2008 | Townsley | ............. | A01G 9/16 47/17 |
| 2014/0115958 A1 * | 5/2014 | Helene | ............. | A01G 9/24 47/17 |
| 2014/0283452 A1 * | 9/2014 | Dittman | ............. | A01G 31/02 47/62 R |
| 2019/0082617 A1 * | 3/2019 | Moffitt | ............. | A01G 7/02 |
| 2019/0230878 A1 * | 8/2019 | Albert | ............. | A01G 31/06 |

(Continued)

FOREIGN PATENT DOCUMENTS

CA  3042051 A1 *  5/2017  ............. E04H 5/08

OTHER PUBLICATIONS

Modular Farms Co., http://modularfarms.co/.

(Continued)

*Primary Examiner* — Lisa L Tsang
(74) *Attorney, Agent, or Firm* — Emerson, Thomson & Bennett, LLC; Roger D. Emerson

(57) ABSTRACT

A modular greenhouse assembly may include one or more grow containers, each having a plant space, and one or more support containers. The containers may be positioned side by side and stacked on top of each other. By properly, but easily, aligning corresponding ports in the containers, light and air can be conveyed to properly care for the plants in the plant space.

11 Claims, 20 Drawing Sheets

(56) References Cited

U.S. PATENT DOCUMENTS

2020/0214228 A1* 7/2020 Cho .................. A01G 9/18

OTHER PUBLICATIONS

Vertical Crop Consultants, http://cropbox.co/index.php.
Growtainer, http://www.growtainers.com/growtainer-2-2/.
Freight Farms, https://www.freightfarms.com/.
Green Gro Technologies, https://greengrotech.com/modular-gro-rooms/.
Zipgrow, https://zipgrow.com/.
Vertical Farming—Indoor Agriculture, http://www.basicknowledge101.com/subjects/verticalfarming.html
Urban Farming is the Future of Agriculture, https://futurism.com/urban-farming-future-agriculture.
Is the Future of Farming Vertical? https://www.greenbiz.com/article/future-farming-vertical.
Agriculture, https://www.agritecture.com/.
Future Food-Production Systems: Vertical Farming and Controlled—Environment Agriculture, https://www.tandfonline.com/doi/full/10.1080/15487733.2017.1394054.
Agrilyst, State of Indoor Farming 2017, https://www.agrilyst.com/stateofindoorfarming2017/.
Estimated Market Value of Vertical Farming in the United States From 2013 to 2024, By Technology Type (In Million U.S. Dollars), https://www.statista.com/statistics/752429/market-value-of-vertical-farming-in-the-united-states-by-technology/.
Vertical Farm Systems, http://www.verticalfarms.com.au/advantages-vertical-farming.
The Economist, Vertical Farming, Does It Really Stack Up?, https://www.economist.com/news/technology-quarterly/17647627-agriculture-growing-crops-vertical-farms-heart-cities-said-be-
Conservation Finance Network, Is it Finally Time for Vertical Farming?, https://www.conservationfinancenetwork.org/2017/10/23/is-it-finally-time-for-vertical farming.
Green Biz, Vertical Farming Climbs in Cleveland, Chicago, New York, https://www.greenbiz.com/article/vertical-farming-climbs-cleveland-chicago-new-york.
AGFunder Network Partners, 3 Big Challenges for Indoor Agriculture, https://agfundernews.com/3-big-challenges-for-indoor-agriculture4864.html.
The Vertical Farm, http://www.verticalfarm.com/.
9 Reasons Why Vertical Farms Fail, https://medium.com/bright-agrotech/9-reasons-why-vertical-farms-fail-244desecd770.
Daily Beast, Vertical Indoor Farms are Growing in the U.S., https://www.thedailybeast.com/vertical-indoor-farms-are-growing-in-the-us.
Solatube, http://www.solatube.com/.

* cited by examiner

MODULAR GREENHOUSE ASSEMBLY

I. BACKGROUND

A. Field of the Invention

This invention generally relates to apparatus and methods related to green houses.

B. Description of Related Art

It is long known to provide buildings specially designed to accommodate growing plants. Such buildings are commonly known as greenhouses. In more recent years it is known to provide modular greenhouses that can be positioned side-by-side and/or stacked on top of each other. Known modular greenhouses, however, are known to have problems and limitations. This patent provides solutions to many of these problems and limitations.

II. SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments of this invention, a modular greenhouse assembly may comprise: A) a first grow container that: 1) has an outer boundary defined by a top, a bottom, and one or more side walls, including a first side wall, that connect the top to the bottom; 2) has an interior volume of at least 1500 cubic feet; 3) has a plant space within the outer boundary that is designed to house one or more associated plants; 4) has a first port formed in the first side wall that communicates with the plant space and that has a cross-section of at least 1 square foot; and, 5) has a second port formed in the first side wall that communicates with the plant space and that has a cross-section of at least 1 square foot; B) a second grow container that: 1) has an outer boundary defined by a top, a bottom, and one or more side walls, including a first side wall, that connect the top to the bottom; 2) has an interior volume of at least 1500 cubic feet; 3) has a plant space within the outer boundary that is designed to house one or more associated plants; 4) has a first port formed in the first side wall that communicates with the plant space and that has a cross-section of at least 1 square foot; 5) has a second port formed in the first side wall that communicates with the plant space and that has a cross-section of at least 1 square foot; and, 6) is designed to support on its top another grow container of the same design; C) a first support container that: 1) has an outer boundary defined by a top, a bottom, and one or more side walls, including a first side wall, that connect the top to the bottom; 2) has an interior volume of at least 1500 cubic feet; 3) has a first conveying component within the outer boundary that is a tube designed to convey plant growth light and that has a minimum cross-section of at least 1 square foot; 4) has a first port formed in the top that communicates with the first conveying component and that has a cross-section of at least 1 square foot; 5) has a second port formed in the bottom that communicates with the first conveying component and that has a cross-section of at least 1 square foot; 6) has a second conveying component within the outer boundary that is a tube designed to convey plant growth light and that has a minimum cross-section of at least 1 square foot; 7) has a third port formed in the top that communicates with the second conveying component and that has a cross-section of at least 1 square foot; 8) has a fourth port formed in the first wall that communicates with the second conveying component and that has a cross-section of at least 1 square foot; and, 9) has a fifth port formed in the first wall that has a cross-section of at least 1 square foot; D) a second support container that: 1) has an outer boundary defined by a top, a bottom, and one or more side walls, including a first side wall, that connect the top to the bottom; 2) has an interior volume of at least 1500 cubic feet; 3) has a first conveying component within the outer boundary that is a tube designed to convey plant growth light and that has a minimum cross-section of at least 1 square foot; 4) has a first port formed in the top that communicates with the first conveying component and that has a cross-section of at least 1 square foot; 5) has a second port formed in the first wall that communicates with the first conveying component and that has a cross-section of at least 1 square foot; 6) has a third port formed in the first wall that has a cross-section of at least 1 square foot; and, 7) is designed to support on its top another support container of the same design. The containers may be designed to be operable such that when the first grow container is stacked on top of the second grow container, the first support container is stacked on top of the second support container, the first wall of the first grow container is beside the first wall of the first support container, and the first wall of the second grow container is beside the first wall of the second support container: 1) the first port in the first grow container communicates with the fourth port in the first support container; 2) the second port in the first grow container communicates with the fifth port in the first support container; 3) the first port in the second grow container communicates with the second port in the second support container port; 4) the second port in the second grow container communicates with the third port in the second support container port; 5) the second port in the first support container communicates with the first port in the second support container; 6) plant growth light is conveyed from outside the first support container, through the first port in the first support container, through the first conveying component in the first support container, through the second port in the first support container, through the first port in the second support container, through the first conveying component in the second support container, through the second port in the second support container, through the first port in the second grow container, and into the plant space in the second grow container; 7) plant growth light is conveyed from outside the first support container, through the third port in the first support container, through the second conveying component in the first support container, through the fourth port in the first support container, through the first port in the first grow container, and into the plant space in the first grow container; 8) air is conveyed between the plant space in the first grow container and the interior of the first support container via the second port in the first grow container and the fifth port in the first support container; and, 9) air is conveyed between the plant space in the second grow container and the interior of the second support container via the second port in the second grow container and the third port in the second support container.

According to other embodiments of this invention, a modular greenhouse assembly may comprise: A) a first grow container that: 1) has an outer boundary defined by a top, a bottom, and one or more side walls, including a first side wall, that connect the top to the bottom; 2) has a plant space within the outer boundary that is designed to house one or more associated plants; 3) has a first port formed in the first side wall that communicates with the plant space and that has a cross-section of at least 1 square foot; 4) has a second port formed in the first side wall that communicates with the plant space and that has a cross-section of at least 1 square foot; 5) has a third port formed in the outer boundary; and, 6) has an air moving device; B) a support container that: 1) has an outer boundary defined by a top, a bottom, and one or more side walls, including a first side wall, that connect the top to the bottom; 2) has a first conveying component within the outer boundary that is a tube designed to convey plant growth light and that has a minimum cross-section of at least 1 square foot; 3) has a first port formed in the top that communicates with the first conveying component and that has a cross-section of at least 1 square foot; 4) has a second port formed in the first wall that communicates with the first conveying component and that has a cross-section of at least 1 square foot; 5) has a second conveying component within the outer boundary that is a tube designed to convey air and that has a minimum cross-section of at least 1 square foot; 6) has a third port formed in the top that communicates with the second conveying component and that has a cross-section of at least 1 square foot; and, 7) has a fourth port formed in first wall that communicates with the second conveying component and that has a cross-section of at least 1 square foot. The containers may be designed to be operable such that when the first grow container is positioned with respect to the support container with the first wall of the first grow container beside the first wall of the support container: 1) the first port in the first grow container communicates with the second port in the support container; 2) the second port in the first grow container communicates with the fourth port in the support container; 3) plant growth light is conveyed from outside the support container, through the first port in the support container, through the first conveying component in the support container, through the second port in the support container, through the first port in the first grow container, and into the plant space in the first grow container; and, 4) air is conveyed by the air moving device in the first grow container from outside the first grow container, through the third port in the first grow container, through the plant space in the first grow container, through the second port in the first grow container, through the fourth port in the support container, through the second conveying component in the support container, and through the third port in the support container.

Benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
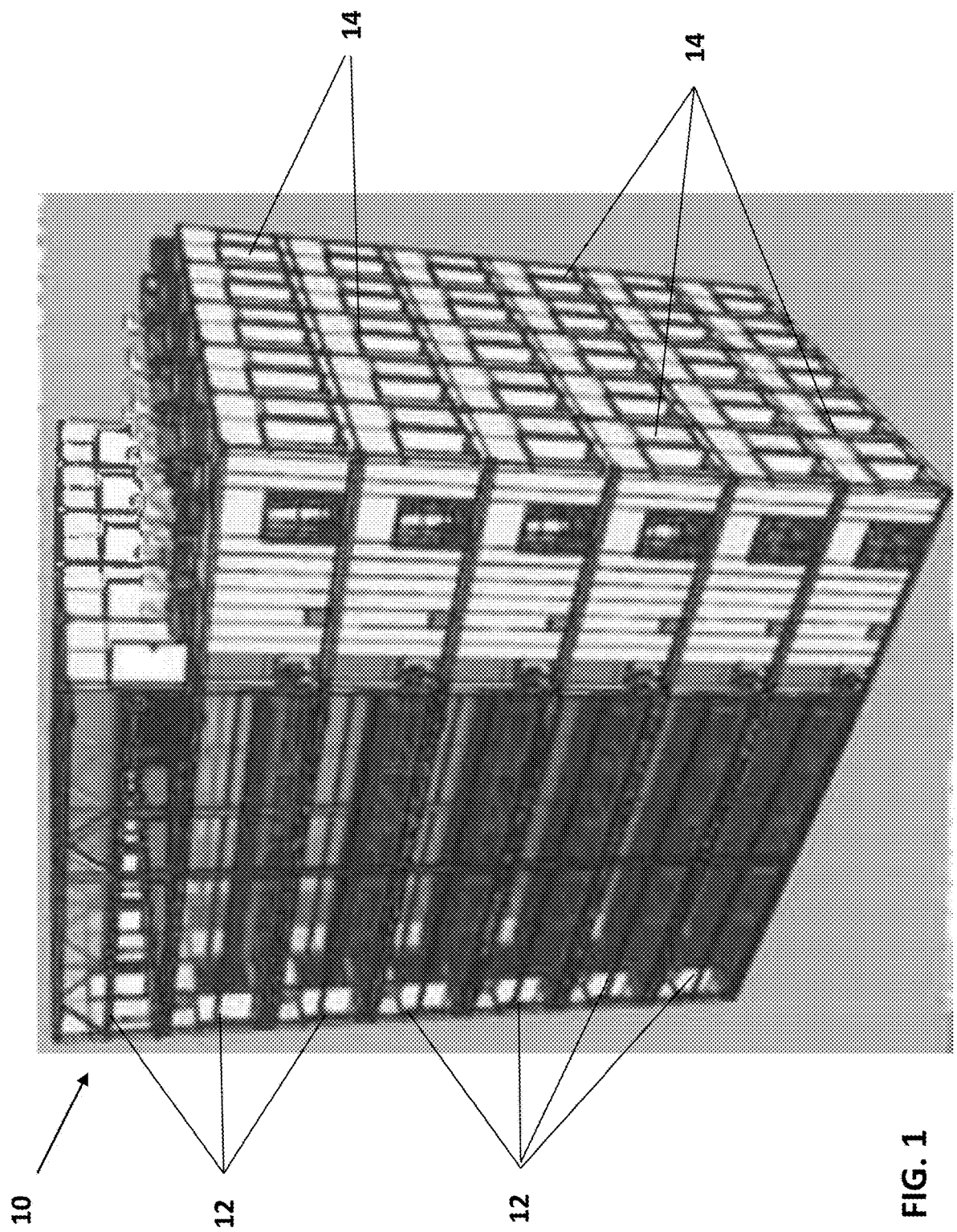
FIG. 1 is a perspective view of a modular greenhouse assembly according to some embodiments of this invention.
Figure 2:
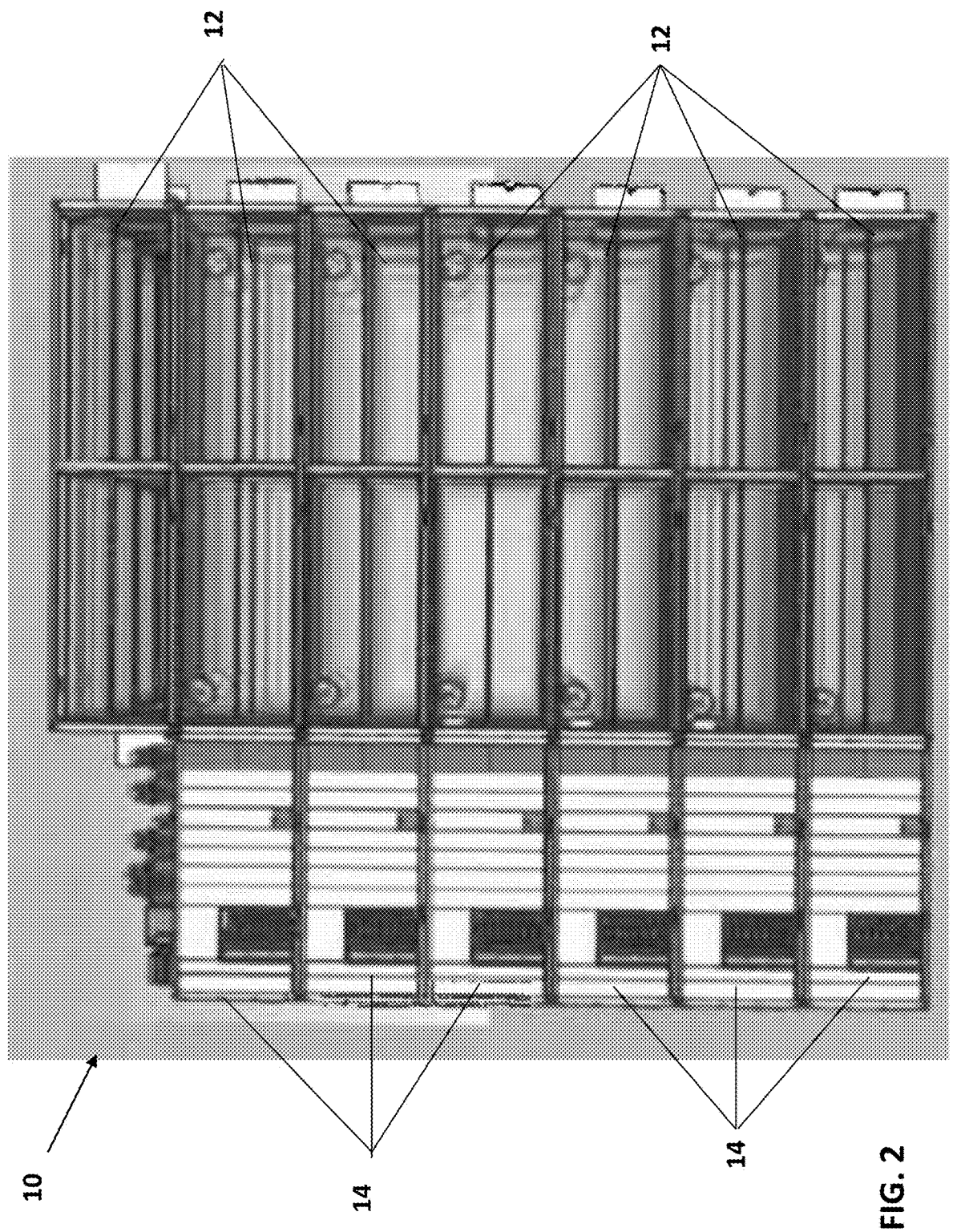
FIG. 2 is a side view of the modular greenhouse assembly shown in FIG. 1.

Referring now to the drawings wherein the showings are for purposes of illustrating embodiments of the invention only and not for purposes of limiting the same, and wherein like reference numerals are understood to refer to like components, FIG. 1 shows a modular greenhouse assembly 10 that incorporates numerous embodiments of this invention. The modular greenhouse assembly 10 may include any desired combination of two types of containers: grow containers 12 and support containers 14. FIGS. 1-2 show the use of 35 grow containers and 30 support containers in a specific arrangement but it should be understood that the actual number and arrangement of containers can be any chosen with the sound judgment of a person of skill in the art.

With reference now to FIGS. 1-4, a grow container 12 may be a container having an outer boundary defined by a top, a bottom, and one or more side walls that connect the top to the bottom. Each grow container 12 may have a plant space 16 within the outer boundary that is designed to house one or more associated plants. In this patent the words "plant" and "plants" are intended to be interpreted broadly. Thus, these words are intended to include all known definitions of "plant" and "plants" as well as all known definitions of fungi, algae and lichen. The plant space 16 may include any plant support device chosen with the sound judgment of a person of skill in the art, such as the tables shown in FIG. 3 and the pots shown in FIG. 4. It should be understood that the use of plant support devices are exemplary only and not intended to limit the scope of this invention in any manner. To assist with natural lighting supplied as plant growth light to the plant space 16, the outer boundary of the grow container 12 may include transparent portions, as shown. In some embodiments, at least 50% of the outer boundary defined by the top, bottom and one or more side walls is transparent. In other embodiments, at least 70% of the outer boundary defined by the top, bottom and one or more side walls is transparent.

With continuing reference to FIGS. 1-4, each grow container 12 may be shaped and sized based on the particular requirements of the intended use. In some embodiments, shown, a grow container 12 is a rectangular prism. In some embodiments, a grow container 12 has the same size as a standard shipping container: 8 feet wide, 40 feet long and 8 feet high. In other embodiments, a grow container 12 is sized: 8 feet wide, 40 feet long and 10 feet high. It should be understood that these sizes are exemplary only. In some embodiments, a grow container 12 has an interior volume of at least 1000 cubic feet. In other embodiments, a grow container 12 has an interior volume of at least 1500 cubic feet. In yet other embodiments, a grow container 12 may have an interior volume matching the sizes noted above. To provide for convenient stacking of grow containers, a grow container 12 may be designed to support on its top one or more other grow containers having the same or a similar design. FIGS. 1-2, for a non-limiting example, show grow containers 12 stacked seven rows high. A grow container 12 may have a floor 30 within its interior to support plants, plant support devices and/or people.

With reference now to FIGS. 3-9, a grow container 12 may have one or more ports 18 formed in its outer boundary. A port 18 may be used to convey something into and/or out of the grow container 12. A port 18 may communicate with the plant space 16 so that what is conveyed can have the desired effect on the plants in the plant space 16. Each port 18 may be sized and shaped in any manner chosen with the sound judgement of a person of skill in the art. In one embodiment, a port 18 may have a cross-sectional area of at least 1 square foot. In one embodiment, a port may be an opening accessible via a door 20. The door 20 may be hinged, as shown, or otherwise selectively openable to provide access to the interior of the grow container 12. For the embodiments shown in FIGS. 3 and 4, a door 20 is positioned on each of the side walls positioned at opposite end of the grow container 12.

Figure 8:
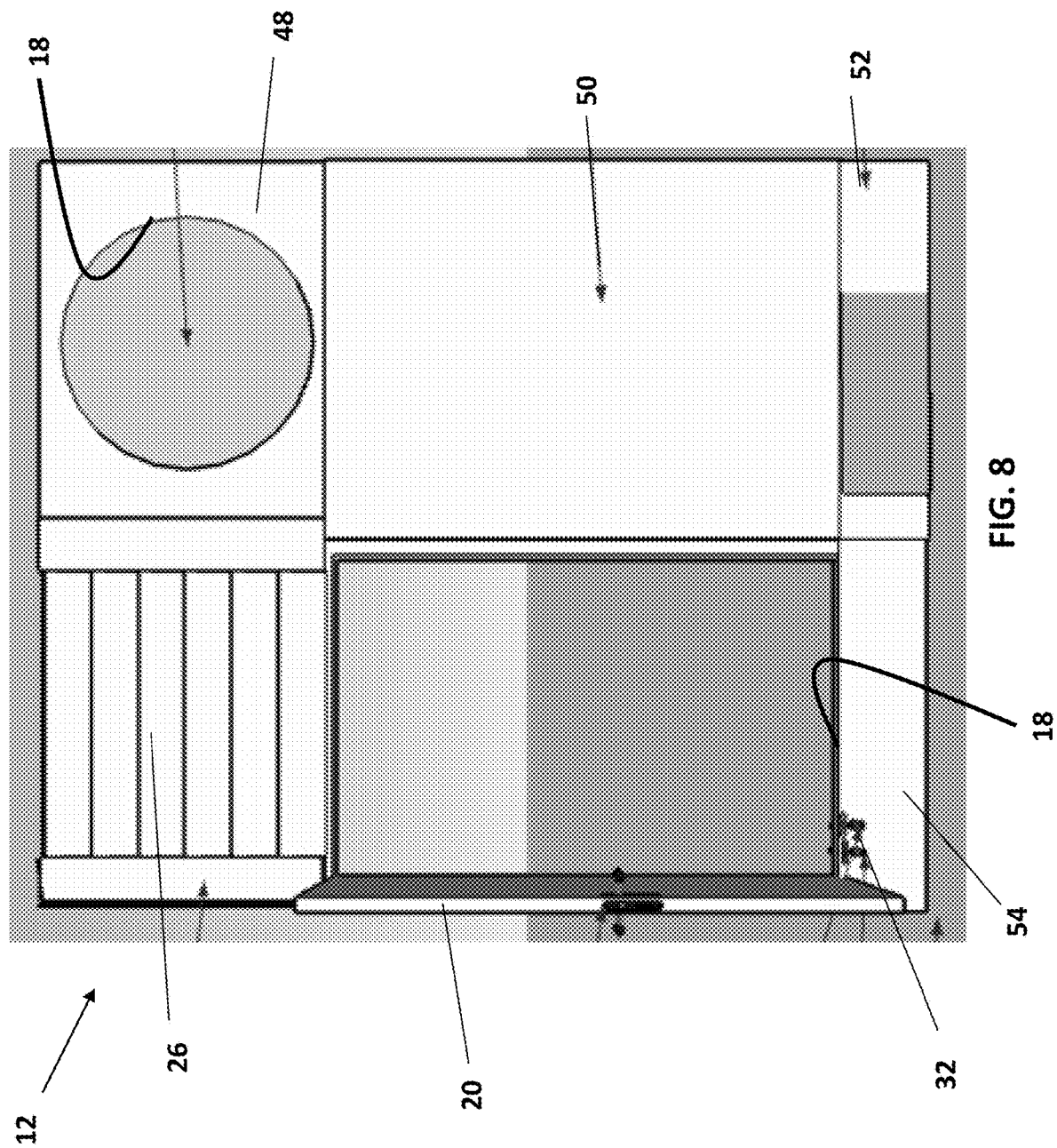
FIG. 8 is an outside view of a grow container side wall.
Figure 9:
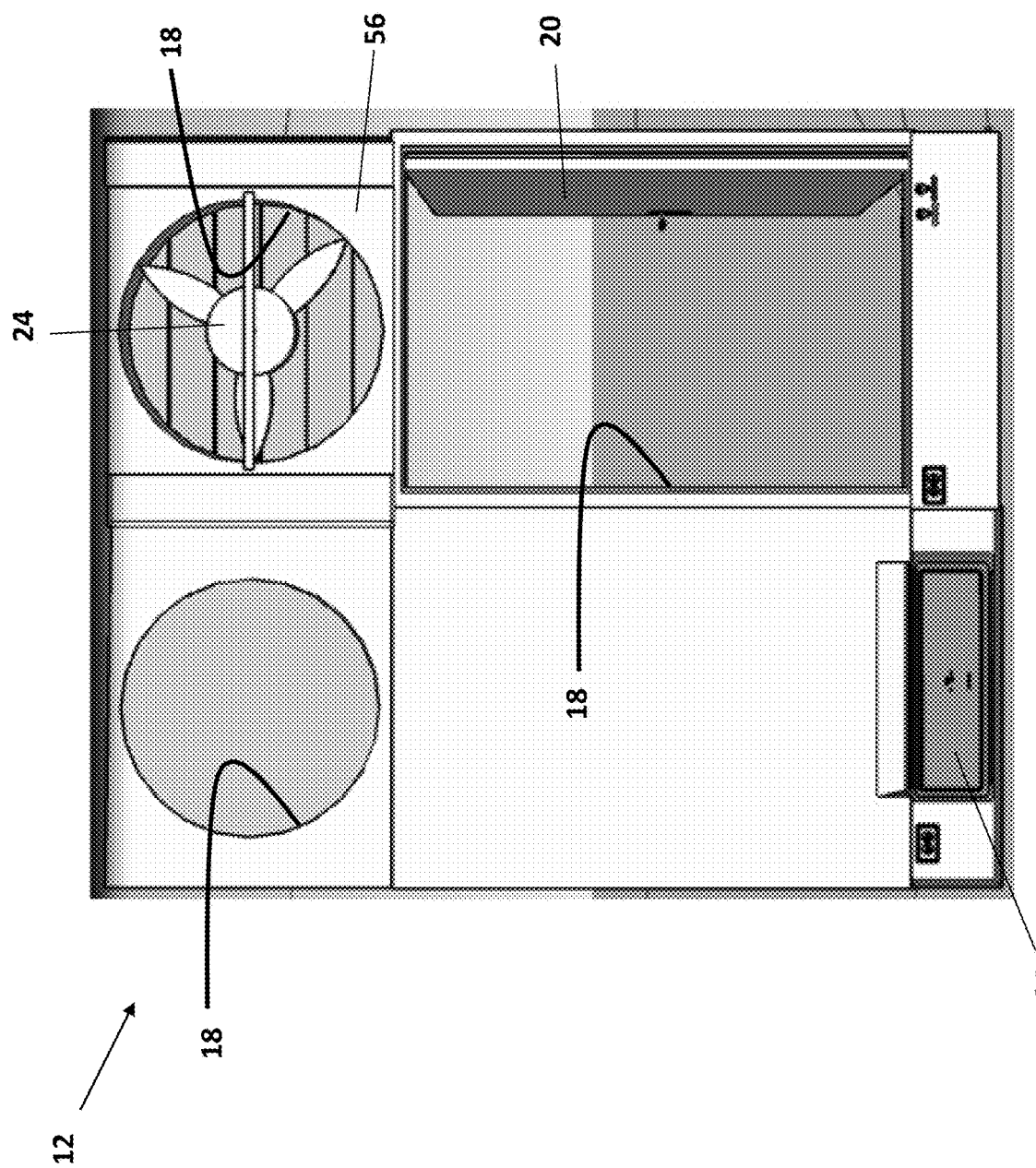
FIG. 9 is an inside view of the grow container side wall shown in FIG. 8.

With continuing reference to FIGS. 3-9, a grow container 12 may have one or more optional implements that assist with caring for the plants in the plant space 16 and/or with the people who enter the grow container 12. In some embodiments, an implement used may be one or more air moving devices in the form of circulating fans 22, two shown in FIGS. 3 and 4. In some embodiments, an implement used may be one or more air moving devices in the form of a ventilation fan 24. The ventilation fan 24 may, in some embodiments such as shown in FIG. 9, operate with a port 18 formed in an outer boundary of the grow container 12. The ventilation fan 24 may also, in some embodiments, operate with an air vent 26 in a known manner, as shown in FIG. 8. In some embodiments, an implement used may be one or more air filters 28 that is/are used to filter the air. In one specific embodiment, the filter 28 includes a temperature adjusting implement in the form of a cooling coil. In another specific embodiment, the filter 28 includes a temperature adjusting implement in the form of a heating coil. It should be understood that the air filters 28 used with this invention can be of any type and size chosen with the sound judgment of a person of skill in the art. The air filters 28 may, in some embodiments, operate with a port 18 formed in an outer boundary of the grow container 12, as shown.

Figure 3:
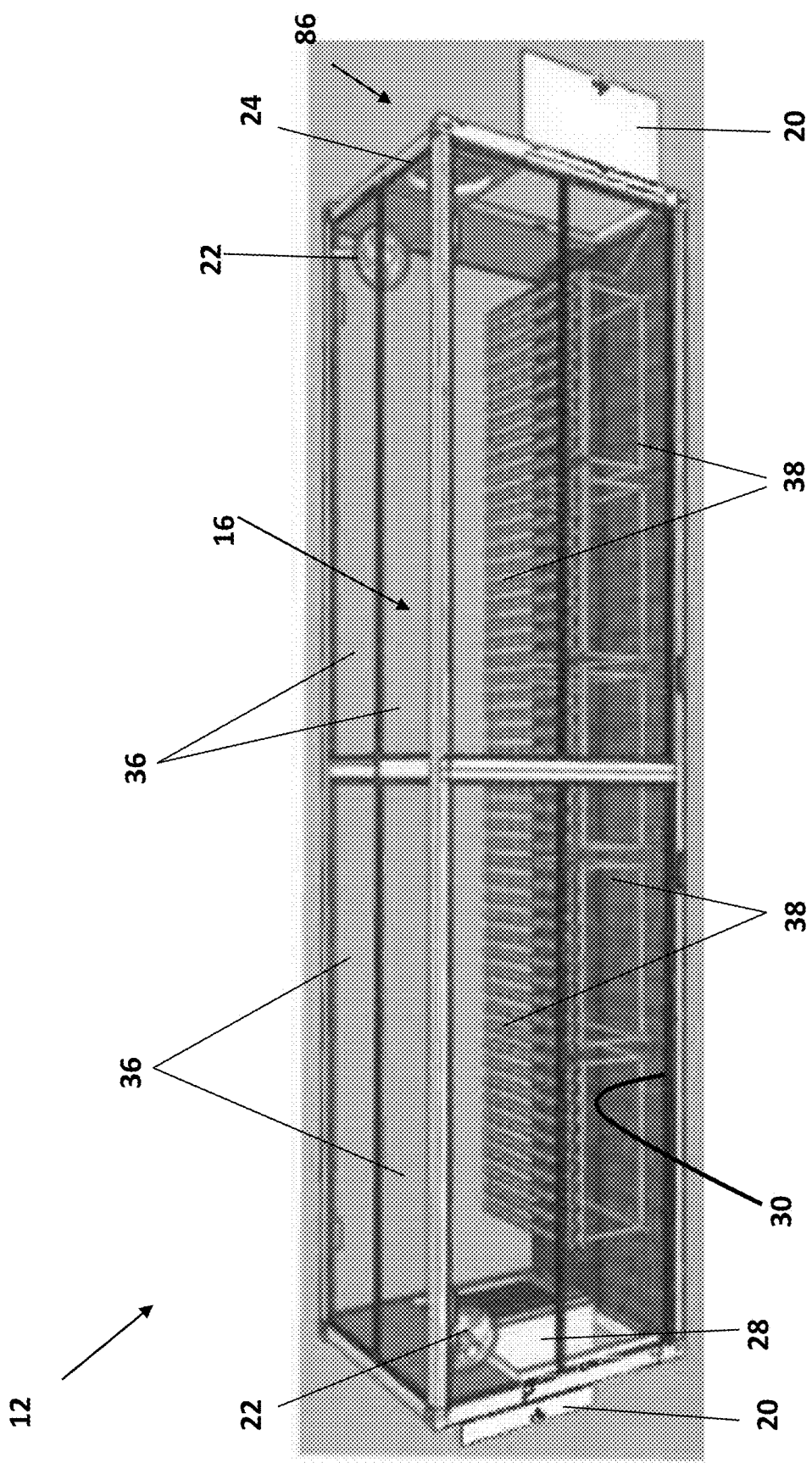
FIG. 3 is a side perspective view of a grow container according to some embodiments of this invention.
Figure 4:
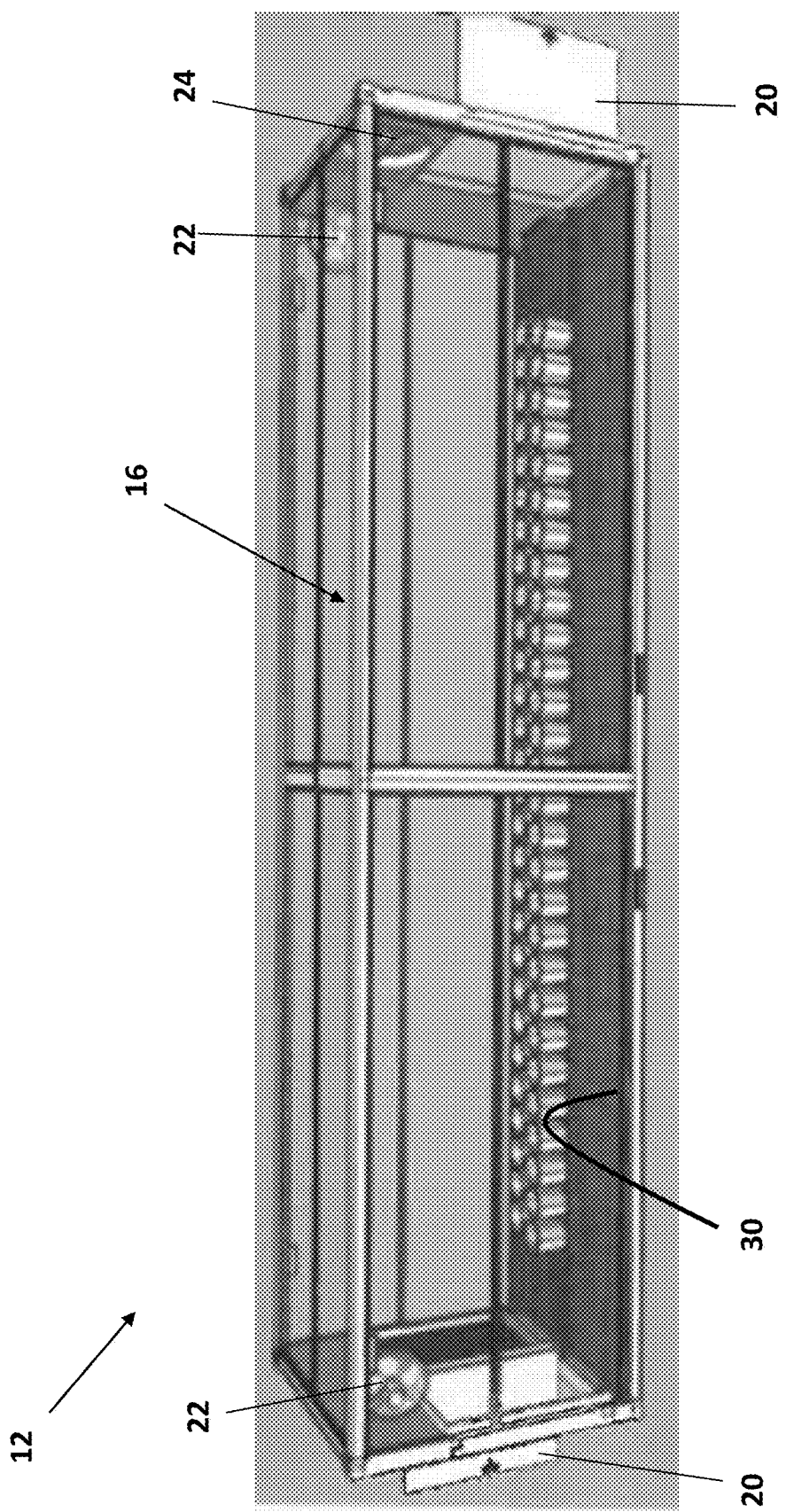
FIG. 4 is a side perspective view of a grow container according to some embodiments of this invention.
Figure 5:
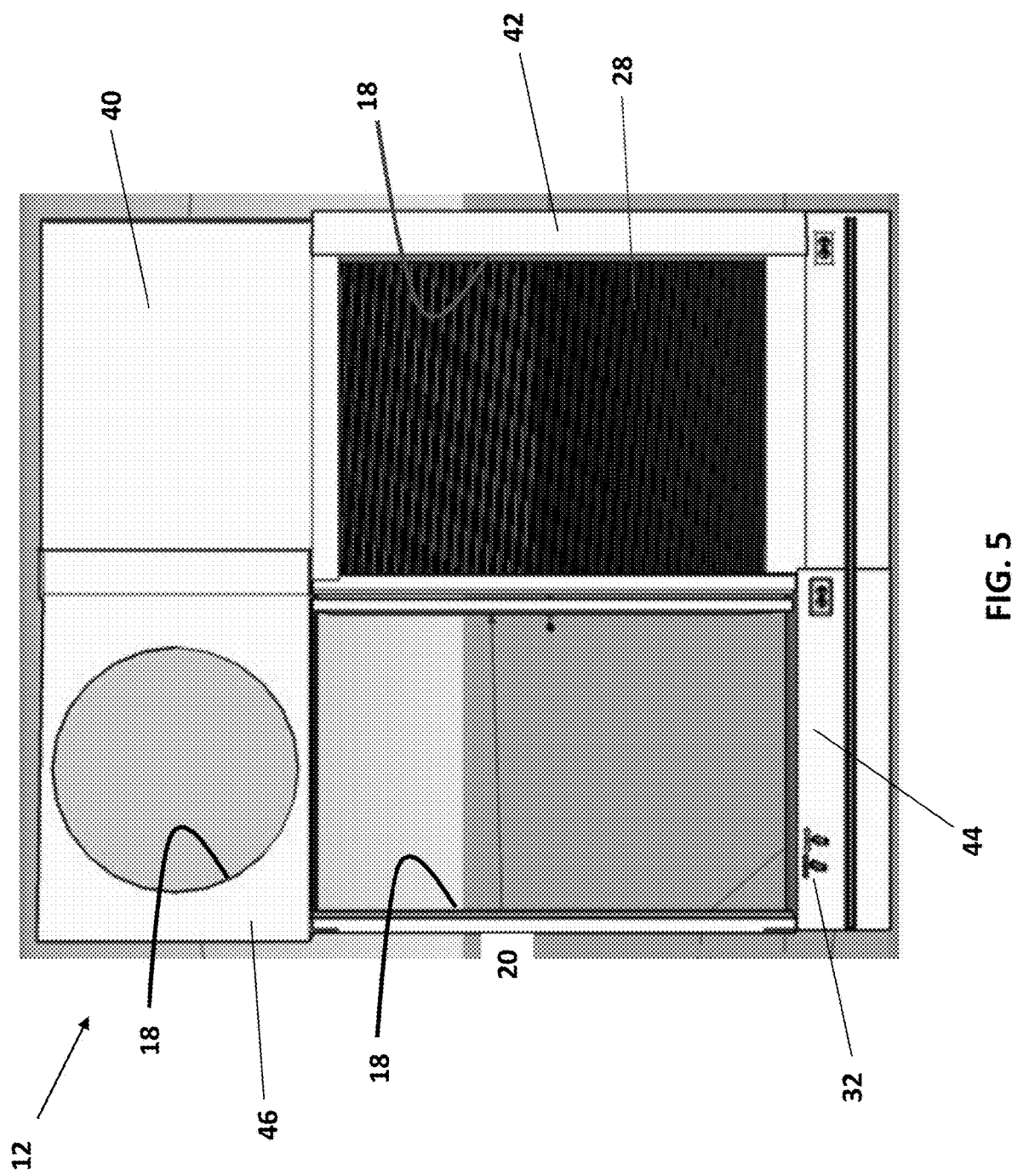
FIG. 5 is an inside view of a grow container side wall.
Figure 6:
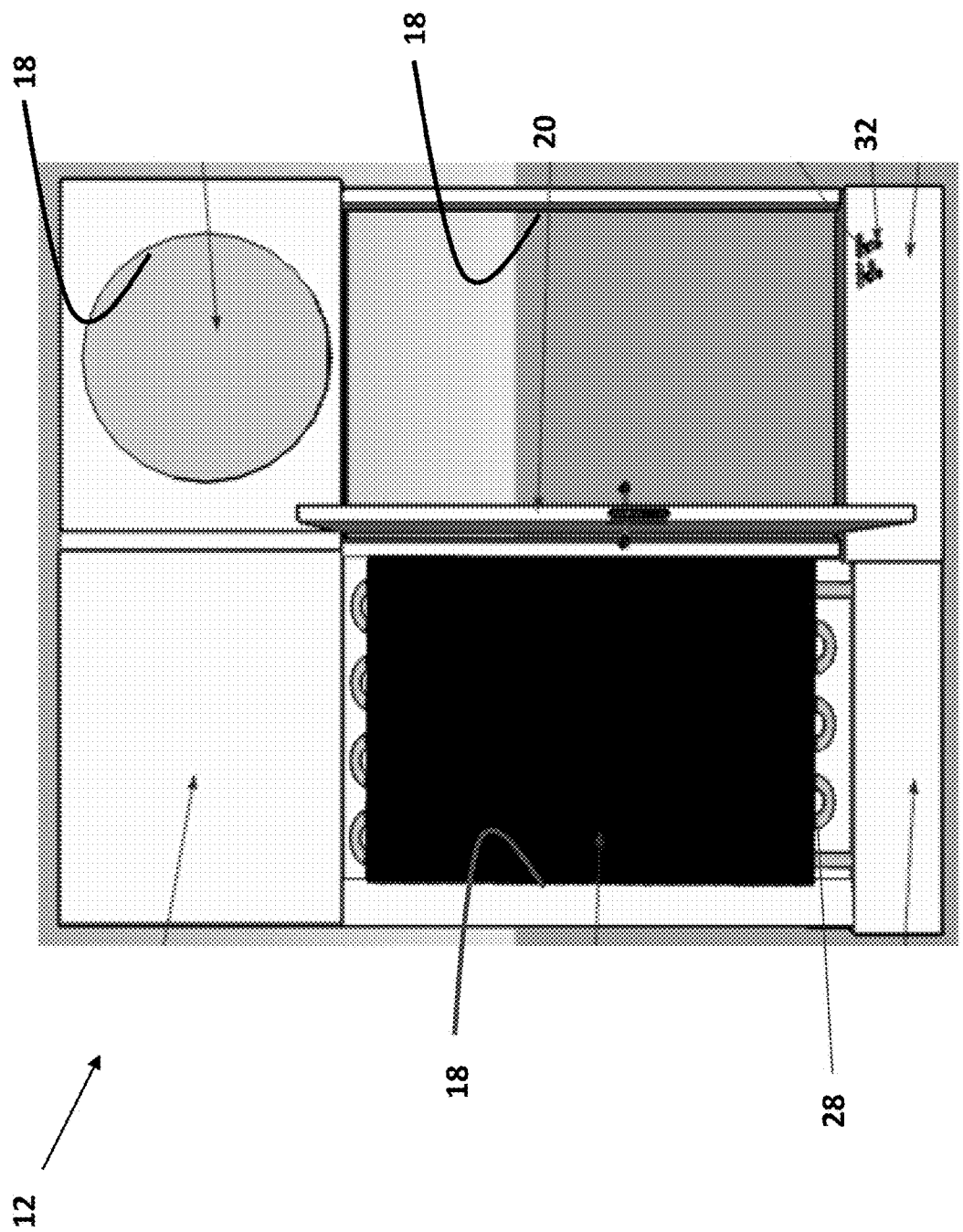
FIG. 6 is an outside view of the grow container side wall shown in FIG. 5.
Figure 7:
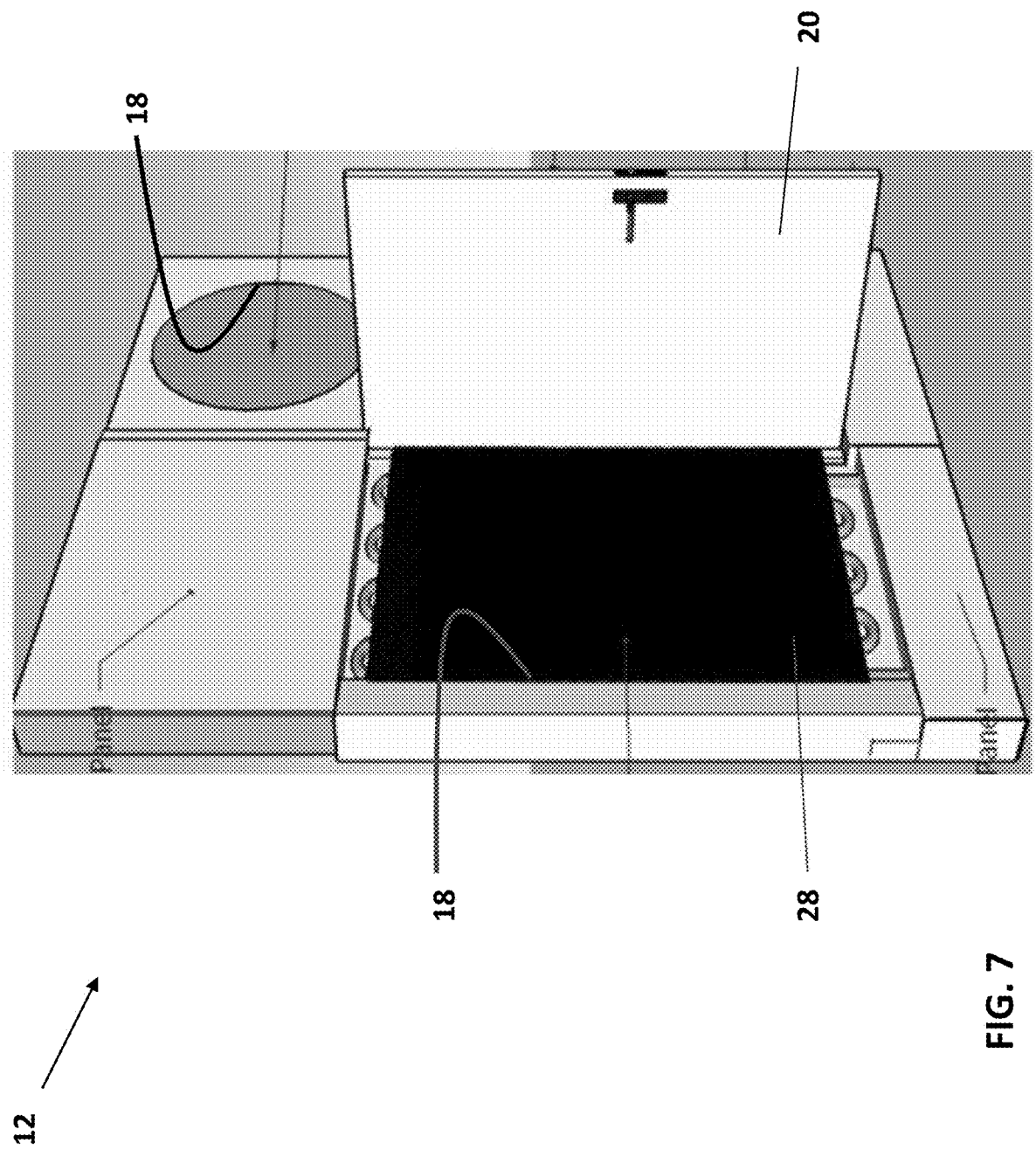
FIG. 7 is a perspective outside view of the grow container side wall shown in FIG. 5.

With continuing reference to FIGS. 3-9, in some embodiments, an implement used with a grow container 12 may be one or more internal water connections 32 that provide water for the plant space 16 or exterior to the grow container 12. Access ports to the internal water connections 32 are shown in FIGS. 5, 6 and 8 and may include valves. This access permits water to be inputted and/or outputted. In some embodiments, shown, the water pipes may extend, at least in part, under the floor 30. In some embodiments, an implement used may be one or more internal HVAC units 34. In one specific embodiment, an internal HVAC unit 34 may be part of a ductless system, with the air handler 34 shown in FIG. 9 and the condenser and/or heat pump to be discussed below.

Still referring to FIGS. 3-9, in some embodiments, the outer boundary of the grow container 12, or at least parts of it, may be formed of distinct panels. Each panel may be sized and shaped in any manner chosen with the sound judgement of a person of skill in the art. A panel may be, in some embodiments, designed for a specific purpose. In FIG. 3, for example, the grow container top is formed of four panels 36 and the side wall facing the observer is formed of four panels 38. The panels 36, 38 may be separated by boundary supports, as shown. Thus for the specific embodiments shown in FIG. 3, each panel 36 and 38 is a planar transparent sheet of material. The grow container 12 shown is FIG. 4 is similarly designed. Panels of various types can be used in other portions of the grow container outer boundary. The grow container side wall shown in FIG. 5, for example, includes: rectangular panel 40, on the upper right, that serves as spacer; rectangular panel 42 on the middle right, that serves as a spacer around the air filter 28; rectangular panel 44 on the lower left, that includes openings that receive the internal water connections access ports; and, rectangular panel 46, on the upper left, that includes port 18 which may be used to engage a later to be described conveying component designed to convey plant growth light. These same panels are visible in FIGS. 6 and 7, though not labeled. Similarly, FIG. 8 includes: rectangular panel 48, on the upper right, that includes port 18 which may be used to engage a later to be described conveying component designed to convey plant growth light (in some embodiments, panel 48 may be identical to previously described panel 46); rectangular panel 50 on the middle right, that serves as a spacer; rectangular panel 52 on the lower right, that receives an HVAC unit 34 (visible in FIG. 9); and, rectangular panel 54 on the lower left, that includes openings that receive the internal water connections access ports. These same panels are visible though not labeled in FIG. 9 but FIG. 9 also shows rectangular panel 56, on the upper right, which includes port 18 which may be used with ventilation fan 24, as shown. It should be noted that while the panels described are rectangular in shape, the panels can be of any shape and any size chosen with the sound judgement of a person of skill in the art. It should also be noted that if any particular implement is not used with any particular grow container 12, the corresponding panel can easily be removed and replaced with a spacer panel; and vice versa.

Figure 10:
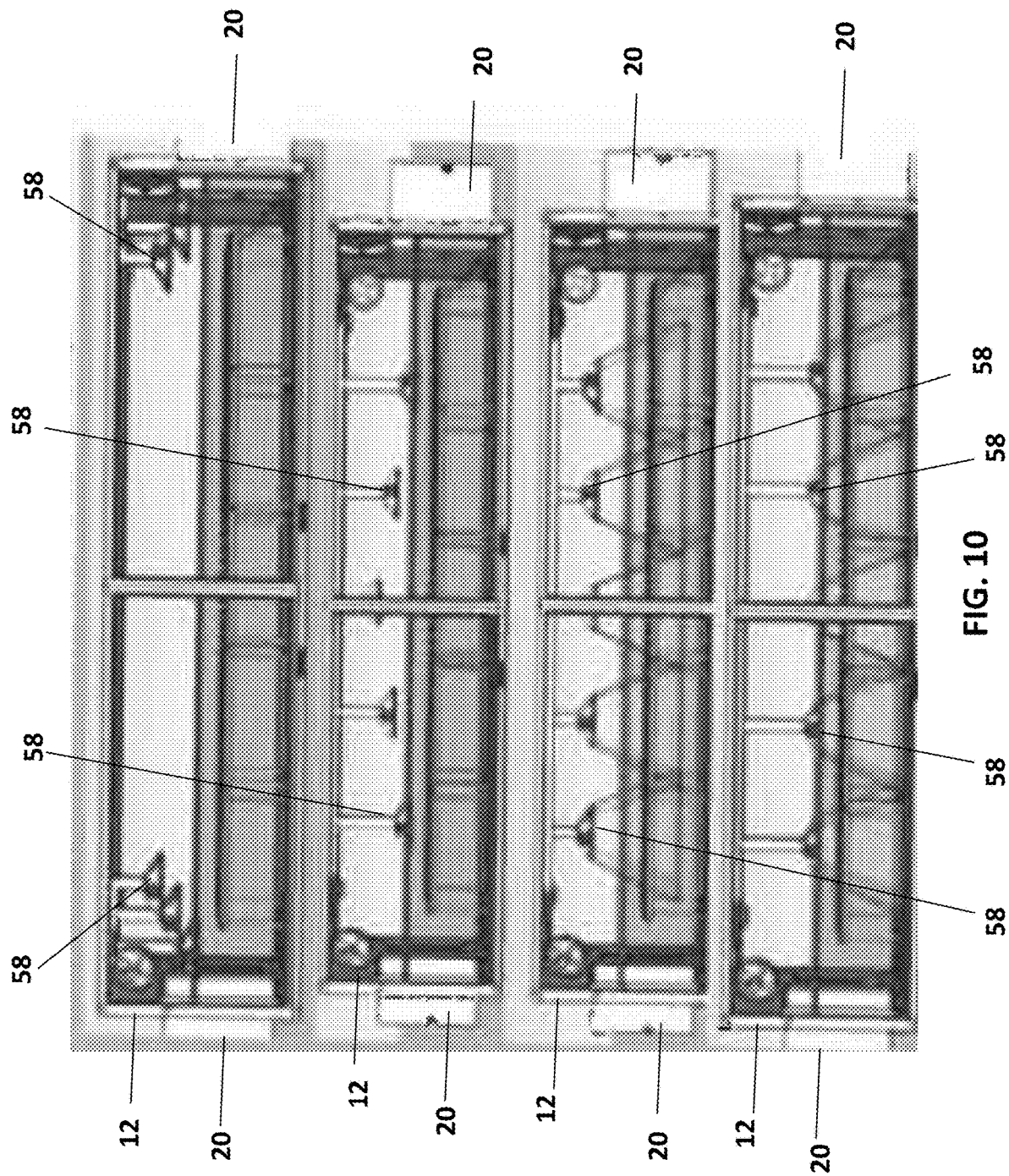
FIG. 10 is a side view of one grow container shown with artificial lights in four different positions.

FIG. 10 shows a grow container 12 and illustrates other embodiments of this invention. The grow container 12 shows the use of artificial plant growth light sources 58. By "plant growth light" it is meant light that can be used in causing plant growth. In the top view, the light sources 58 are shown in a retracted position and non-illuminated condition, near the right and left ends of the grow container 12. In the second down view, the light sources 58 are shown in an extended position, in the plant space, and non-illuminated condition. In the third down view, the light sources 58 are shown in a raised position and illuminated condition and in the bottom view the light sources 58 are shown in a lowered position and illuminated condition. Each grow light may be attached to an adjustable post and each post may be attached to a rail system. The posts may allow the lights to be raised and lowered separately of one another to get the proper height from the plants. Additionally the lights may be staggered when fully retracted (stored) and thus may be adjusted independently of each other. The rail system may work as a pulley system retracting & extending the lights similar to the rotating clothing rack at a dry cleaner. Both the rail system and posts may be operated manually or electrically.

With reference now to FIGS. 1-2 and 11-15, a support container 14 may be a container having an outer boundary defined by a top, a bottom, and one or more side walls that connect the top to the bottom. A support container 14, in some embodiments, may be equipped to support one or more grow containers 12. However, in other embodiments a grow container 12 may not be supported by a support container—such as the grow containers in the top row shown in FIGS. 1 and 2. Each support container 14 may be shaped and sized based on the particular requirements of the intended use, such as the requirements of the grow container(s) it will support. In some embodiments, shown, a support container 14 is a rectangular prism. In some embodiments, a support container 14 has the same size as a standard shipping container: 8 feet wide, 40 feet long and 8 feet high. In other embodiments, a support container 14 is sized: 8 feet wide, 40 feet long and 10 feet high. It should be understood that these sizes are exemplary only. In some embodiments, a support container 14 has an interior volume of at least 1000 cubic feet. In other embodiments, a support container 14 has an interior volume of at least 1500 cubic feet. In yet other embodiments, a support container 14 may have an interior volume matching the sizes noted above. In some embodiments, the interior volume of a support container 14 may be the same as the interior volume of the grow container 12 it supports. To provide for convenient stacking of support containers, a support container 14 may be designed to support on its top one or more other support containers having the same or a similar design. FIGS. 1-2, for a non-limiting example, show support containers 14 stacked six rows high. A support container 14 may have a floor 60 within its interior to support various implements and/or people.

With continuing reference to FIGS. 1-2 and 11-15, a support container 14 may have one or more ports 62 formed in its outer boundary. A port 62 may be used to convey something into and/or out of the support container 14 and may be aligned with a corresponding port 18 in a grow container 12 so that something conveyed may have the desired effect on the plants within the plant space 16 within a corresponding grow container(s) 12. Each port 62 may be sized and shaped in any manner chosen with the sound judgement of a person of skill in the art. In one embodiment, a port 62 may have a cross-sectional area of at least 1 square foot. In some embodiments a port 62 may have a cross-section that matches the cross-sectional of a corresponding port 18 in a grow container 12. In one embodiment, a port 62 may be an opening in the side wall that is accessible via a door 64. The door 64 may be hinged, as shown, or otherwise selectively openable to provide access to the interior of the support container 14. In one embodiment, a port 62 may be an opening in the top or bottom that is accessible via a hatch door 76. The hatch door 76 may be selectively openable to provide access to the interior of the support container 14.

With continuing reference to FIGS. 1-2 and 11-15, a support container 14 may have one or more optional implements that assist with caring for the plants in the plant space 16 of a grow container 12 and/or with the people who enter the support container 14 and/or grow container 12. In some embodiments, one or more implements 66 used may be a conveying component within the outer boundary that is a tube (also referred to as a light pillar) designed to convey plant growth light. In some embodiments, the tube 66 may be designed to convey natural light, in other embodiments it may be designed to convey artificial light and in yet other embodiments it may designed to convey natural and artificial light. In one non-limiting embodiment, the tube 66 may be a SOLATUBE®. One or both ends of the tube 66 may communicate with a port 62. The tube 66 may also branch off into other tubes and/or ports 62. The tube 66 may be sized and shaped in any manner chosen with the sound judgement of a person of skill in the art. In one embodiment, the tube 66 may have a minimum cross-section of at least 1 square foot. In some embodiments, one or more implements 68 used may be a conveying component within the outer boundary that is a tube designed to convey air. One or both ends of the tube 68 may communicate with a port 62. The tube 68 may also branch off into other tubes and/or ports 62. The tube 68 may be sized and shaped in any manner chosen with the sound judgement of a person of skill in the art. In one embodiment, the tube 68 may have a minimum cross-section of at least 1 square foot.

Figure 14:
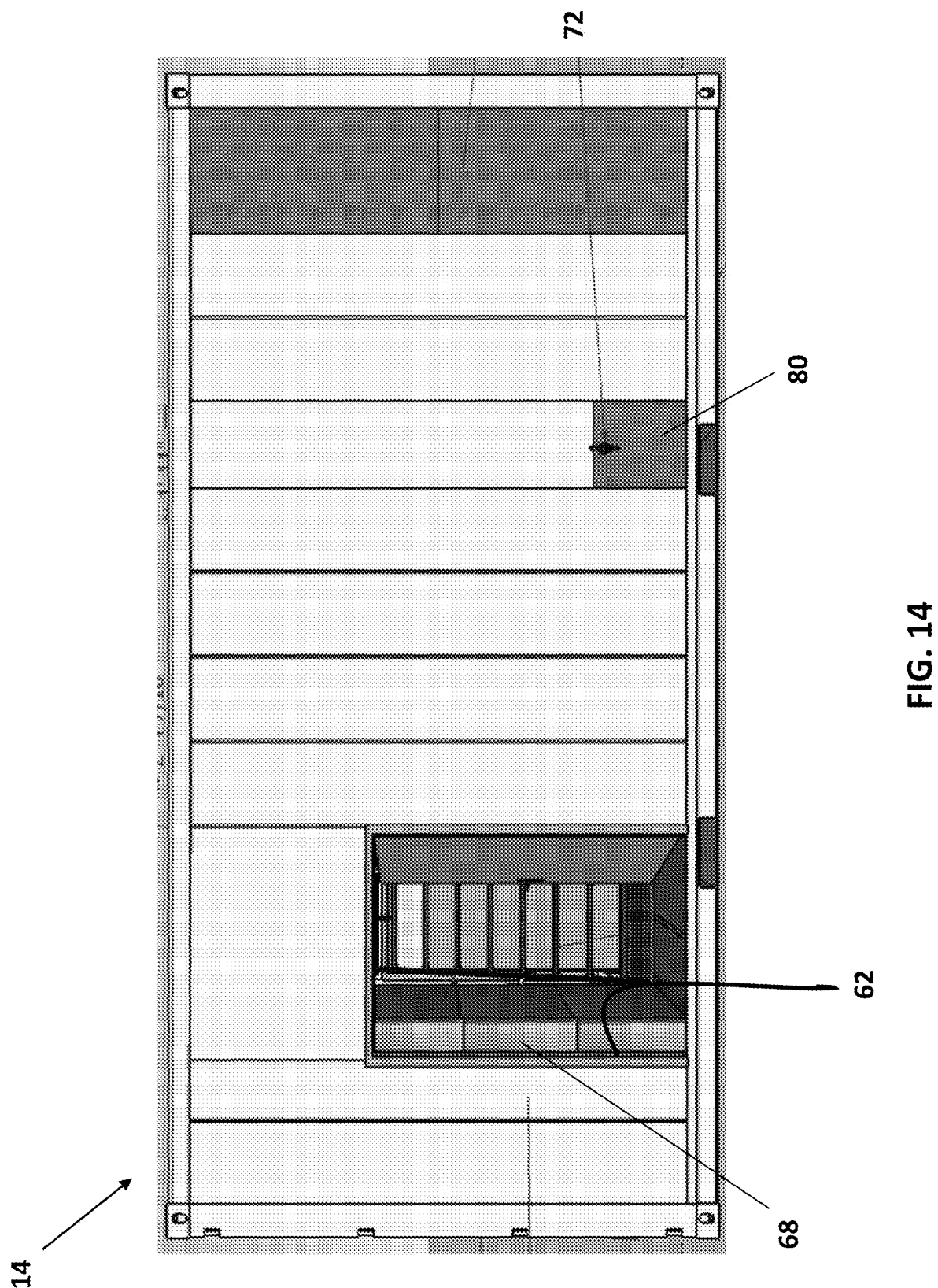
FIG. 14 is a side view of a support container according to some embodiments.
Figure 15:
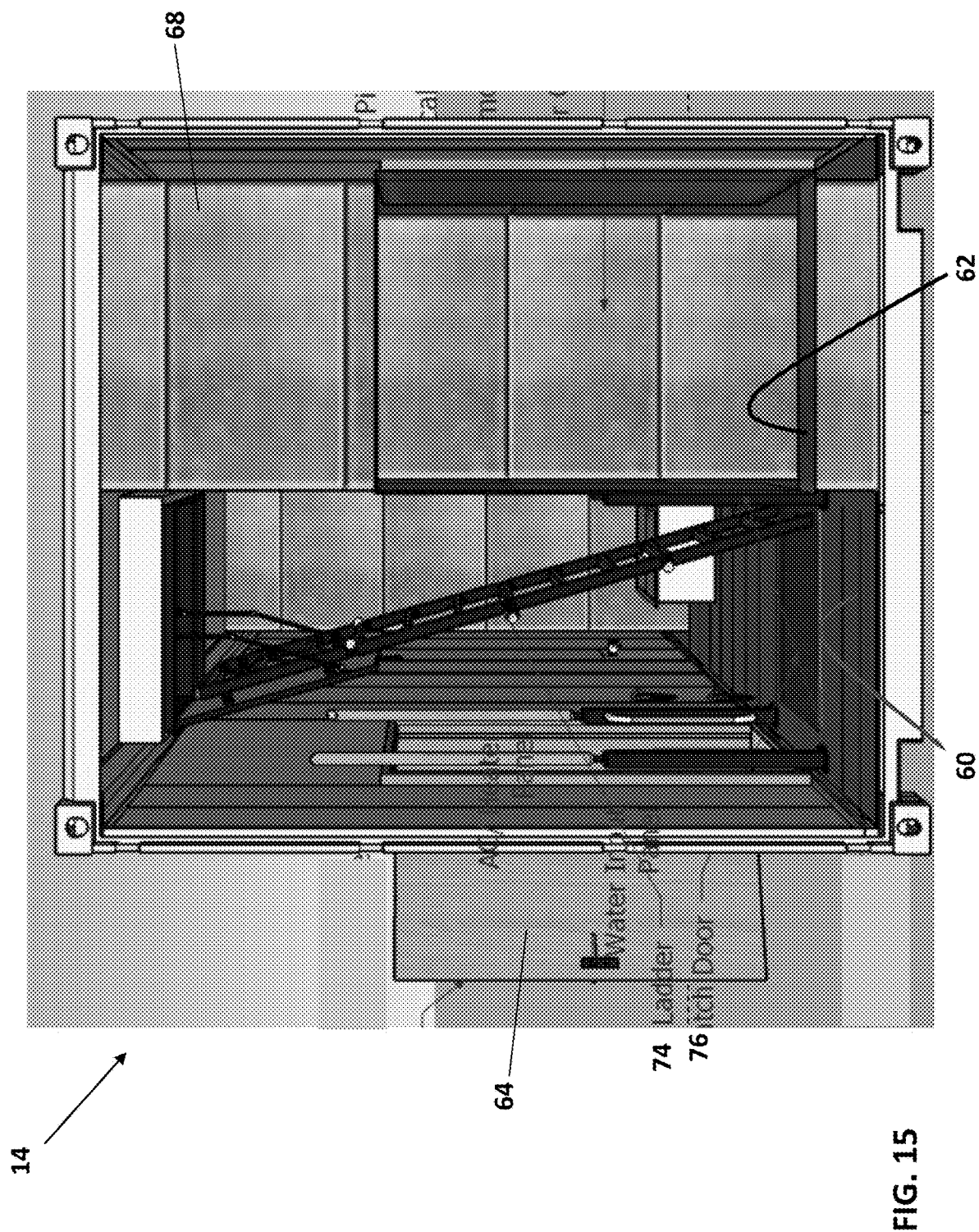
FIG. 15 is an end view of the support container shown in FIG. 14, with portions of side walls removed.
Figure 16:
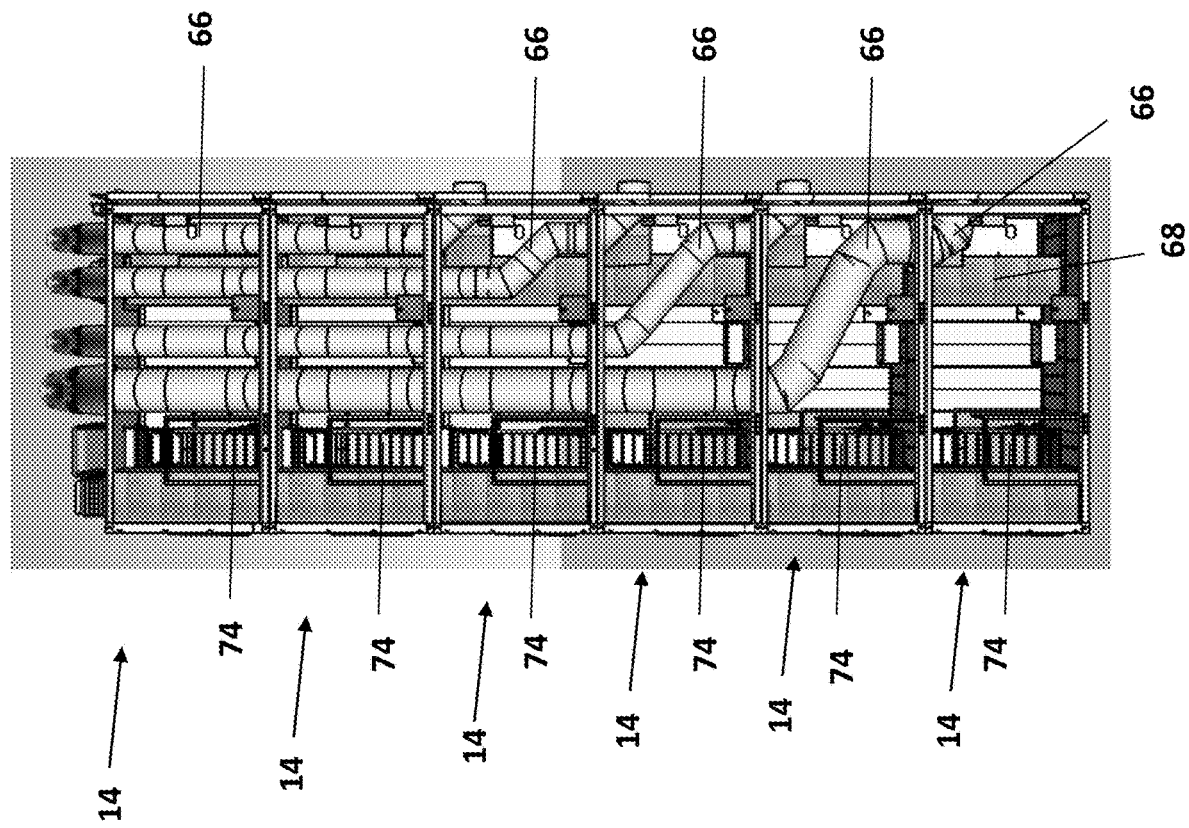
FIG. 16 is a side view of six stacked support containers, with portions of side walls removed, showing embodiments of this invention.
Figure 17:
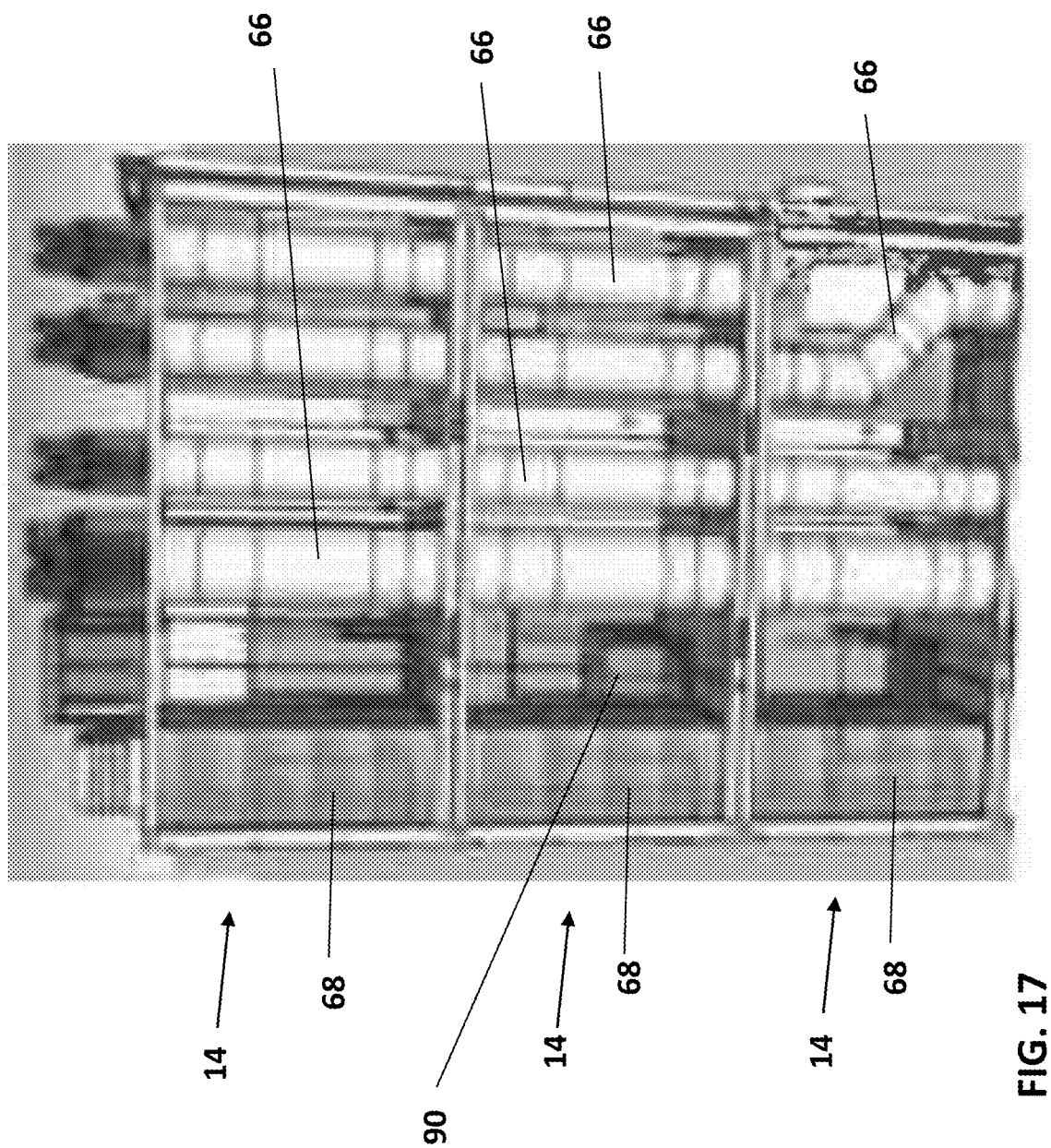
FIG. 17 is a side view of three stacked support containers, with portions of side walls removed, showing embodiments of this invention.
Figure 18:
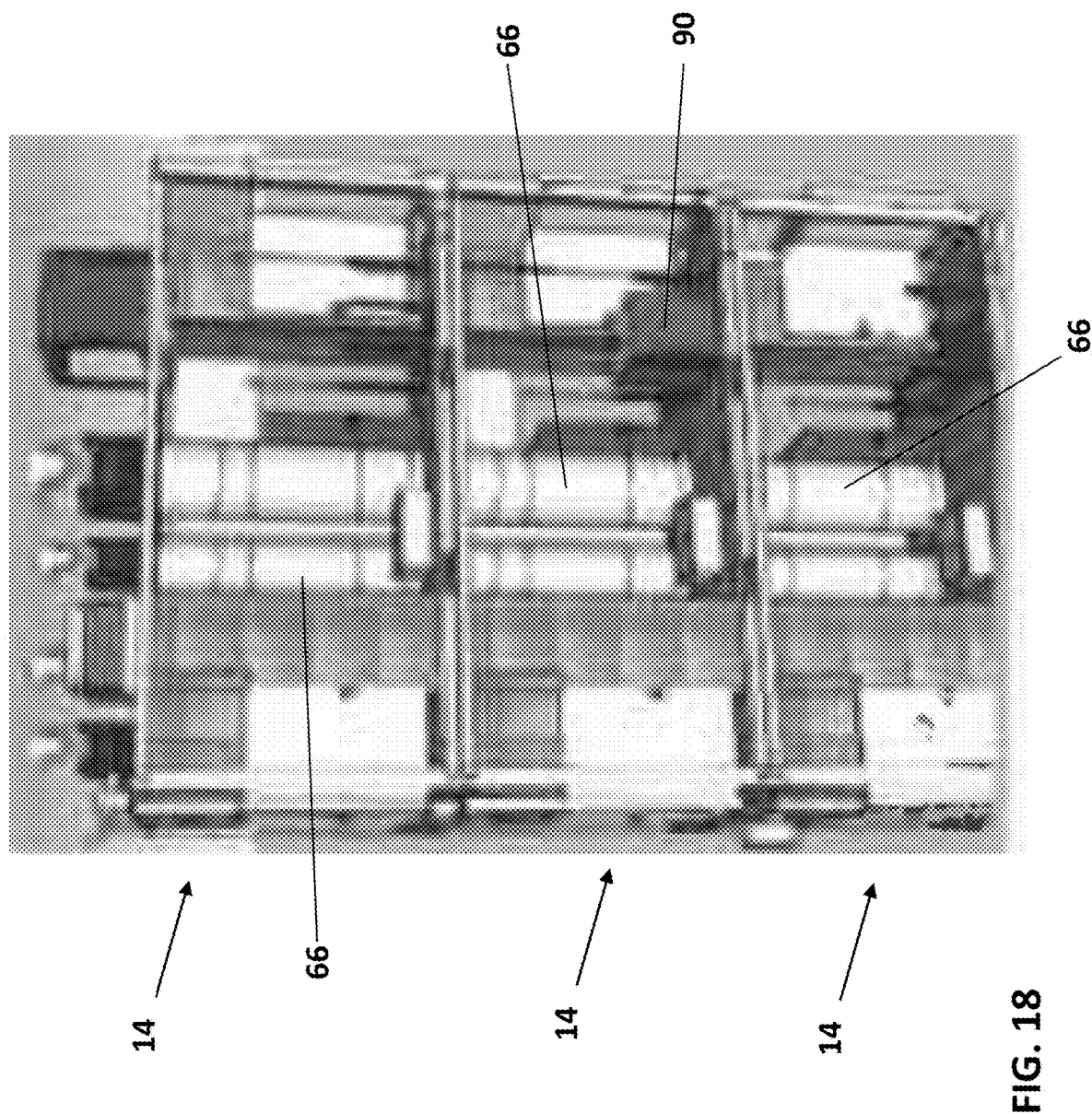
FIG. 18 is a side view of three stacked support containers, with portions of side walls removed, showing embodiments of this invention.

Still referring to FIGS. 1-2 and 11-15, in some embodiments, an implement used with a support container 14 may be one or more external HVAC units 70. In one specific embodiment, an external HVAC unit 70 may be part of a ductless system, with the condenser and/or heat pump 70 shown in FIGS. 11-13 and the air handler 34 shown in FIG. 9 as discussed above. In some embodiments, a single external HVAC unit 70 may supply two or more air handlers 34. In some embodiments, an implement used with a support container 14 may be one or more external water connections 72 that supply water for the interior and/or exterior of the support container 14. Access ports to the external water connections 72 are shown in FIG. 14 and may include valves. This access permits water to be inputted and/or outputted. In some embodiments, shown, the water pipes may extend, at least in part, under the floor 60.

With reference now to FIGS. 1-2 and 11-18, in some embodiments, other implements that may be used with a support container 14 include a thermostat, an electrical box, a safety rail, a dumbwaiter 90 (see FIGS. 17-18 for a dumbwaiter that can be raised and lowered between multiple support containers 14) and a ladder 74. In some embodiments, the ladder 74 may be vertically extending and next to a port 62 formed in the top of the support container 14 and/or to a port formed in the bottom of support container 14. These ports 62 may have hatch doors 76, as mentioned above. In this way, a person may easily move up and/or down between stacked support containers 14. See in FIG. 16, for example, the six ladders 74 in the six stacked support containers 14 making it easy for a person to climb up and down between the six support containers 14.

With reference now to FIGS. 1-2 and 11-15, in some embodiments, the outer boundary of the support container 14, or at least parts of it, may be formed of distinct panels.

Each panel may be sized and shaped in any manner chosen with the sound judgement of a person of skill in the art. The panels, in some embodiments, may be separated by boundary supports. A panel may be designed for a specific purpose, similar to the panels noted above used with the grow container 12. FIGS. 11-15, for example, include rectangular panel 78 that serves as an external HVAC panel and that includes a port 62 used to engage the HVAC unit 70; rectangular panel 80 that serves as a external water connection panel that includes openings that receive the external water connection access ports 72; and, a panel 82 for the electrical box and a panel 84 for the thermostat. It should be noted that while the panels described are rectangular in shape, the panels can be of any shape and any size chosen with the sound judgement of a person of skill in the art. It should also be noted that if any particular implement is not used with any particular support container 14, the corresponding panel can easily be removed and replaced with a spacer panel; and vice versa.

Figure 11:
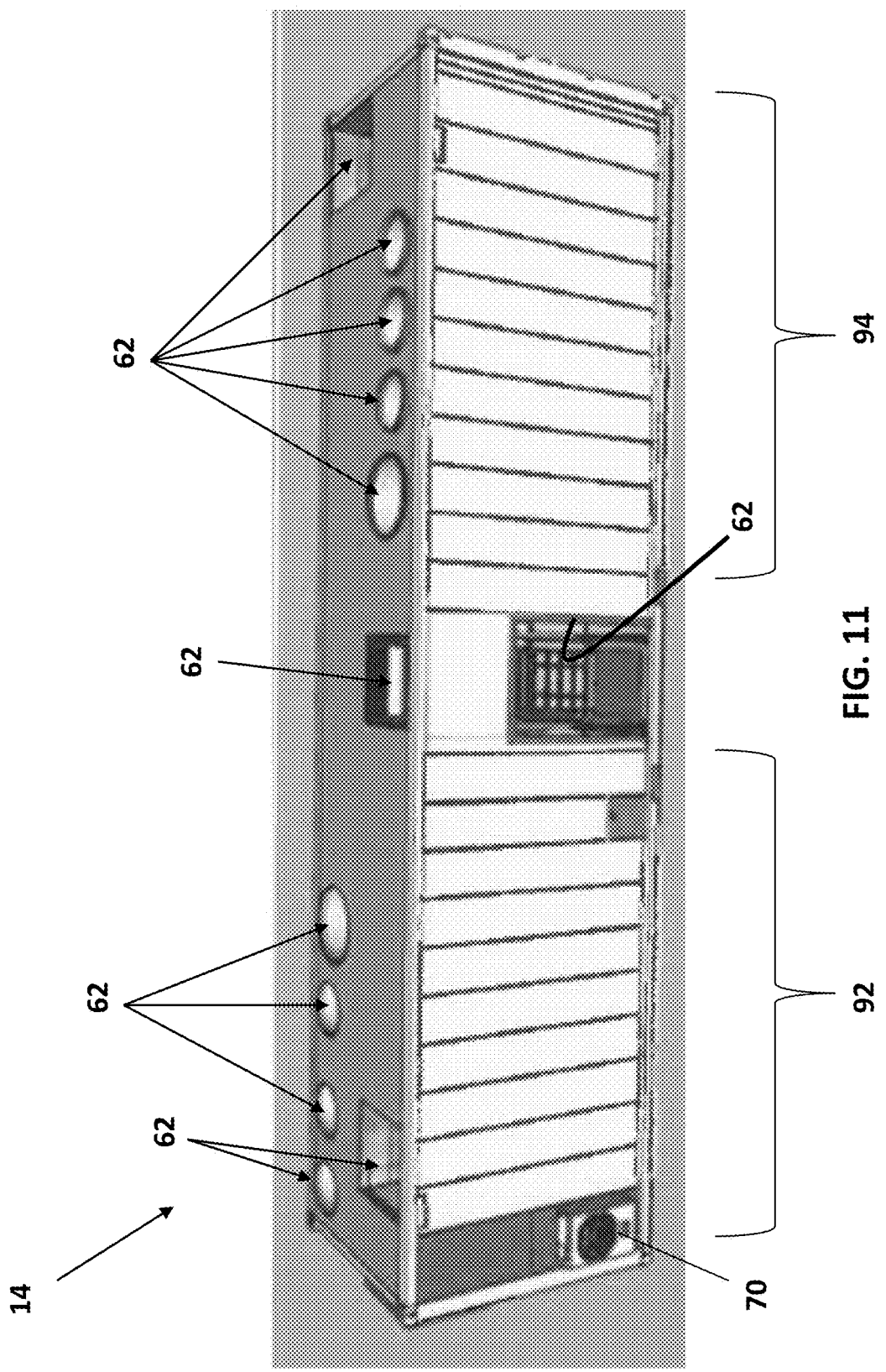
FIG. 11 is a side perspective view of a support container according to some embodiments of this invention.
Figure 12:
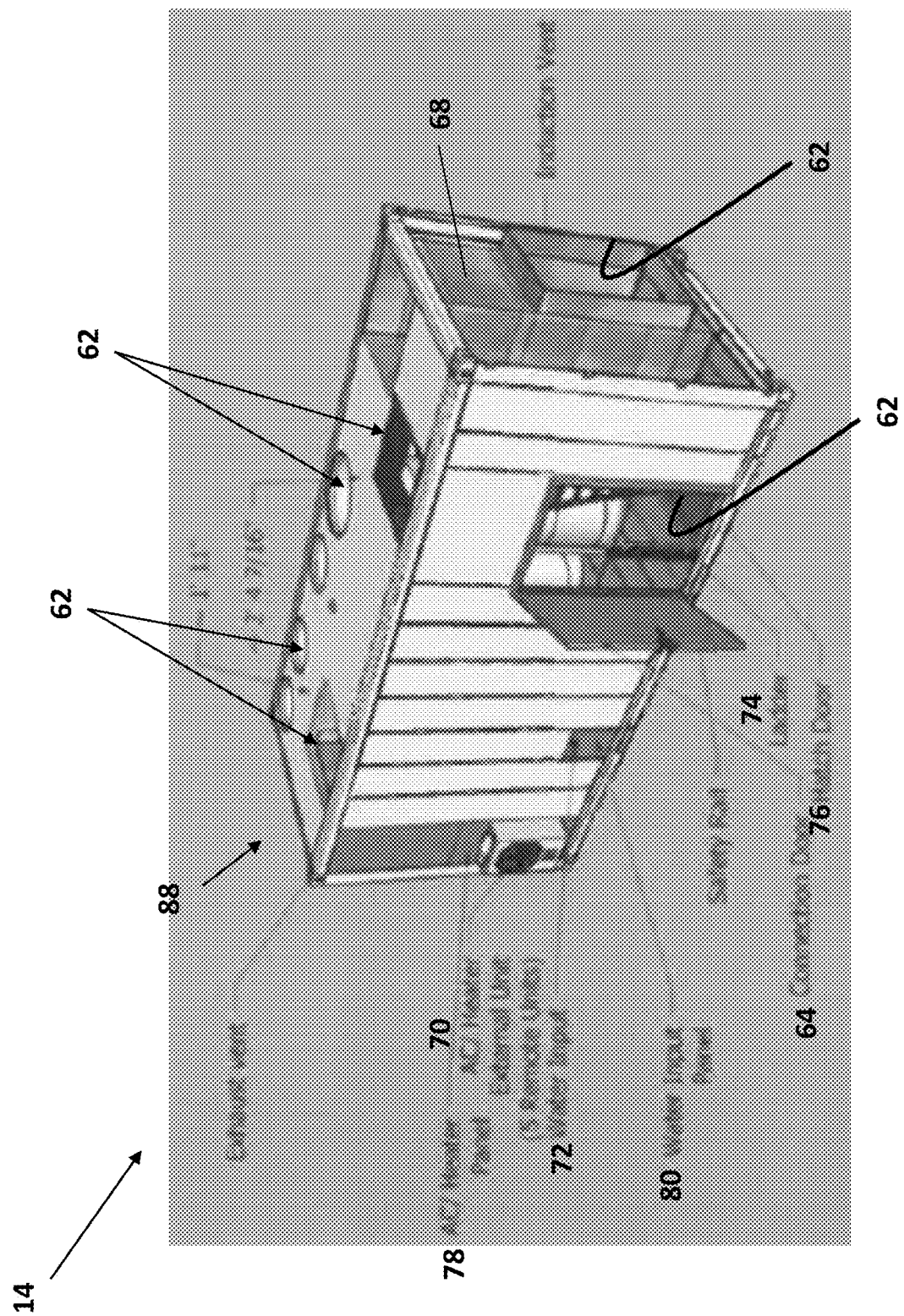
FIG. 12 is a side perspective view of a support container with portions of side walls removed, according to some embodiments of this invention.
Figure 13:
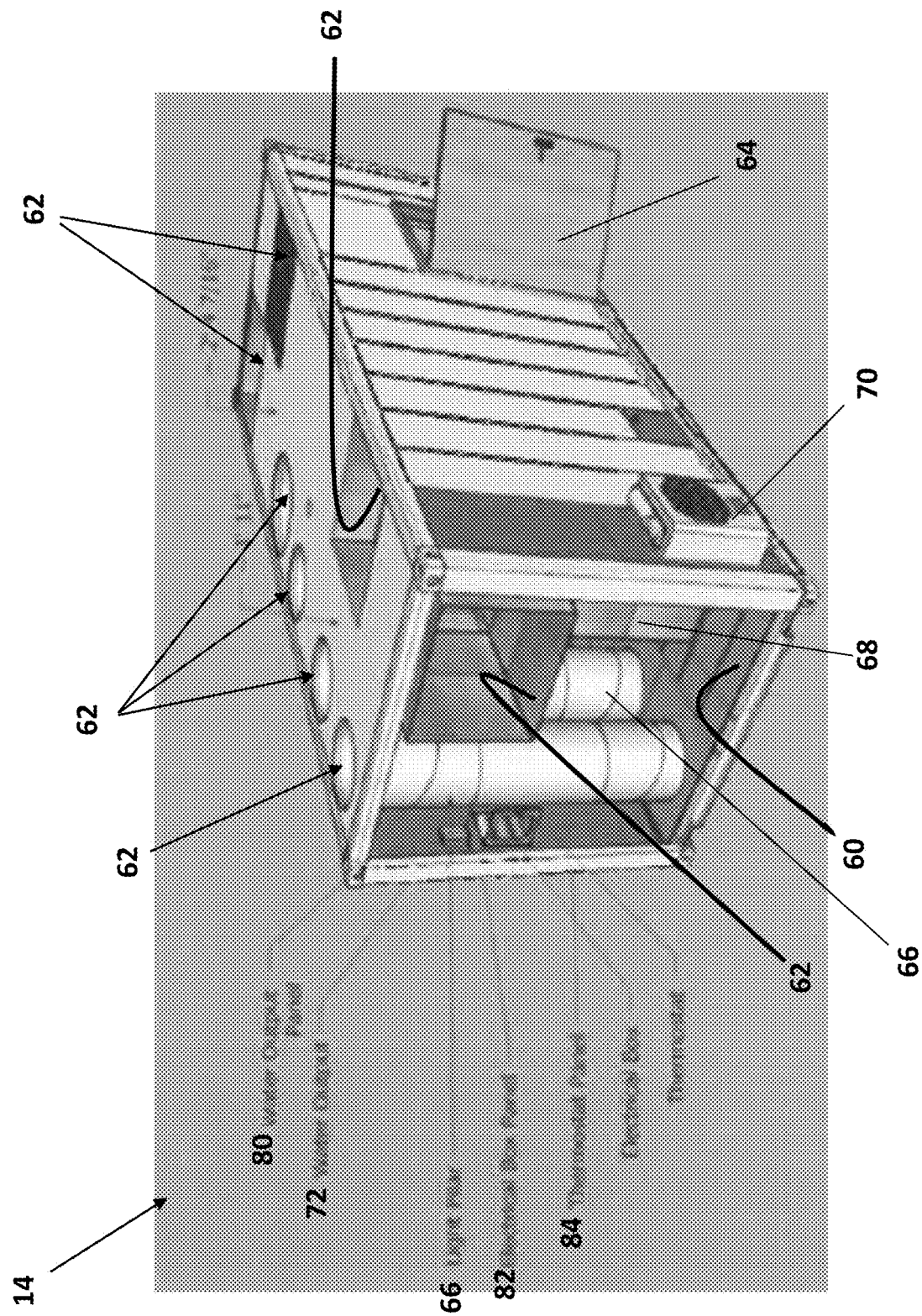
FIG. 13 is an end perspective view of the support container shown in FIG. 12, with portions of side walls removed.

FIG. 11 shows a support container 14 having a first end 92 and a second end 94. Each end 92, 94 is sized and shaped to support one or more grow containers. Thus, the support container 14 in FIG. 11 is equipped to support grow containers on each of its ends 92, 94.

Figure 19:
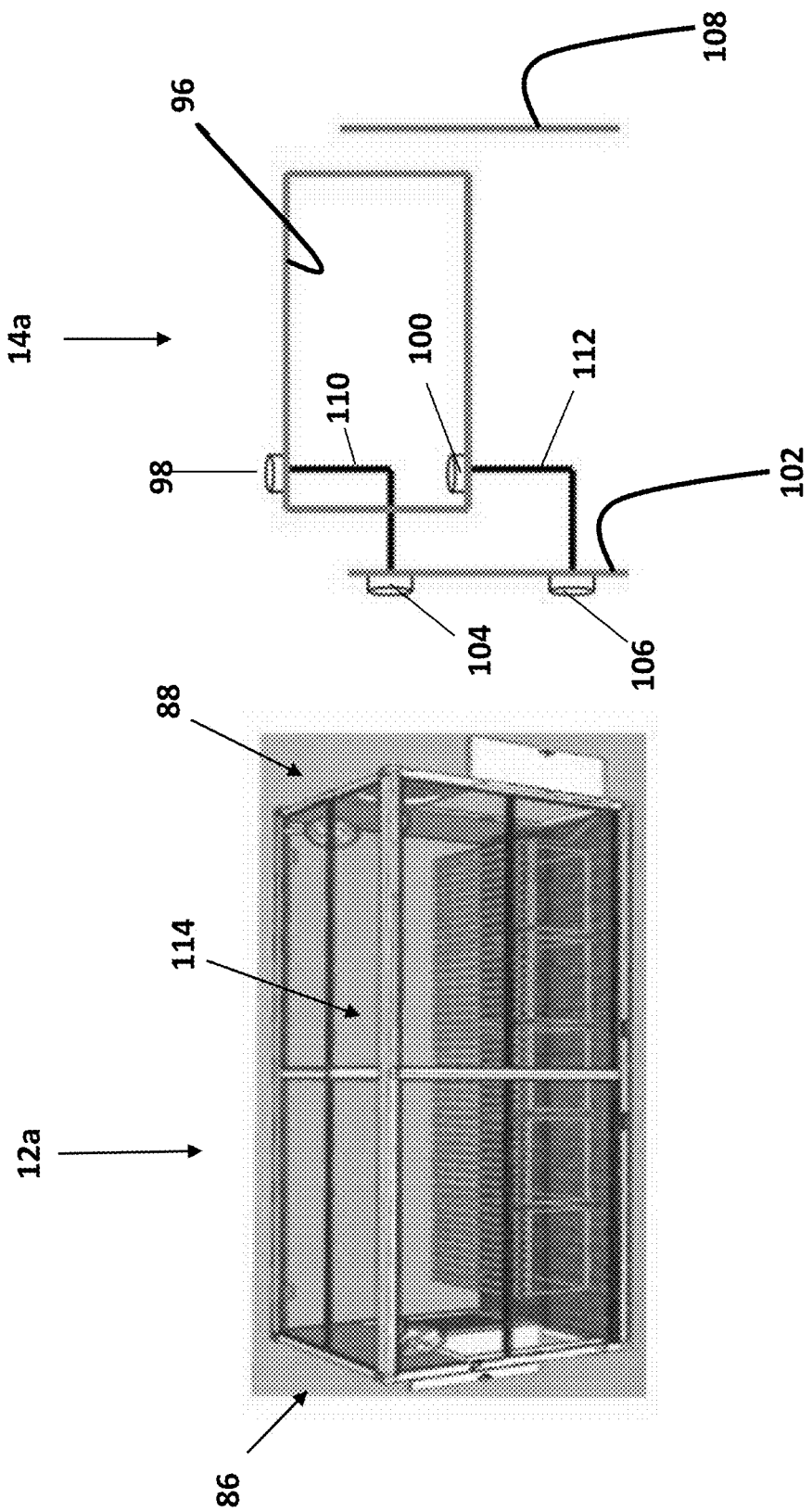
FIG. 19 shows embodiments of a grow container and support container, with the support container shown schematically.

With reference now to all the FIGURES but especially FIG. 19, with the grow and support containers 12, 14 now explained, some of the many ways they can be used to construct a modular greenhouse assembly 10 can now be discussed. In one embodiment, illustrated in FIG. 19, one grow container 12*a*, similar to the one shown in FIG. 3, can be matched with one support container 14*a* (shown schematically), similar to the one shown in FIGS. 12-13. Grow container 12*a* may have side wall 86 similar to the side wall shown in FIG. 5, but with panel 46 replaced with a spacer panel, and side wall 88 similar to the side wall shown in FIG. 9. Support container 14*a* may have a top 96, with ports 98, 100, a side wall 102, with ports 104, 106 and a side wall 108, opposite side wall 102. Support container 14*a* may also have a conveying component 110, a tube designed to convey plant growth light that communicates with ports 98 and 104, and a conveying component 112, a tube designed to convey air that communicates with ports 100 and 106. The containers can be placed side by side with side wall 88 on the grow container 12*a* positioned beside the side wall 102 on the support container 14*a*. With this arrangement, support container port 104 communicates with a port in grow container 12*a* similar to port 18 in the upper left of FIG. 9 and support container port 106 communicates with a port in grow container 12*a* similar to port 18 in the upper right of FIG. 9 (next to ventilation fan 24). In operation then, plant growth light may be conveyed from outside the support container 14*a*, through support container port 98, through the conveying component 110, through the container port 104, through the aligned port in side wall 88 (the port similar to port 18 in the upper left of FIG. 9) and into the plant space 114 of grow container 12*a*. Air may be conveyed by the ventilation fan from outside the grow container 12*a*, through the grow container port in side wall 86 similar to port 18 in the middle right of FIG. 5, across the plant space 114, though the grow container port associated with ventilation fan 24 similar to port 18 in the upper right of FIG. 9, through support container port 106, through conveying component 112, and through the support container port 100 and thus out of the support container 14*a*.

Figure 20:
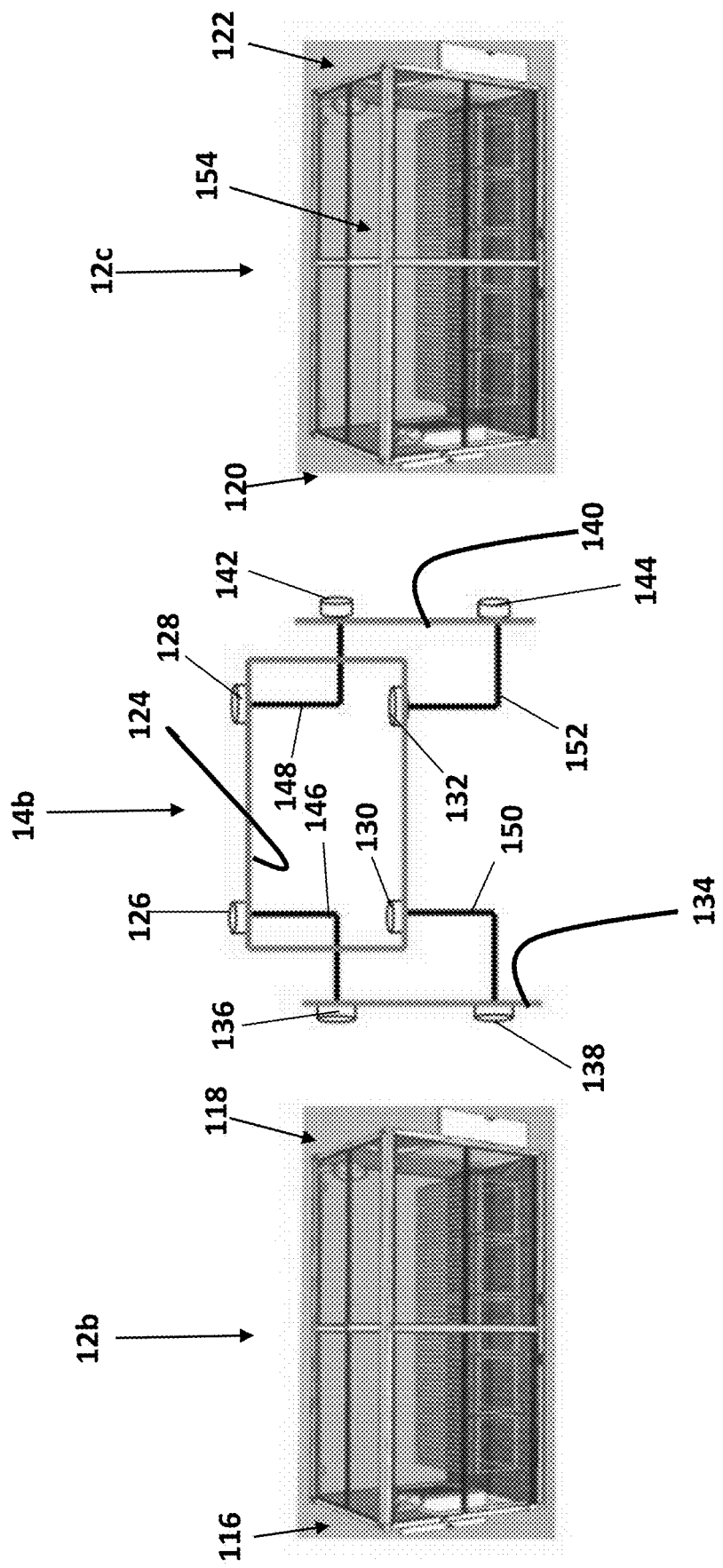
FIG. 20 shows embodiments of two grow containers and support container, with the support container shown schematically.

With reference now to all the FIGURES but especially FIG. 20, in another embodiment, two grow containers 12*b*, 12*c*, similar to the one shown in FIG. 3, can be matched with one support container 14*b* (shown schematically), similar to the one shown in FIG. 11. Grow containers 12*b*, 12*c* may have side walls 116, 118, 120, 122 similar to side walls 86, 88 in FIG. 19 but with side wall 120 having a port similar to port 18 in the upper left of FIG. 5. Support container 14*b* may have a top 124, with ports 126, 128, 130, 132, a side wall 134, with ports 136, 138 and a side wall 140, opposite side wall 134, having ports 142, 144. Support container 14*b* may also have a conveying component 146, a tube designed to convey plant growth light that communicates with ports 126 and 136, a conveying component 148, a tube designed to convey air that communicates with ports 128 and 142, a conveying component 150, a tube designed to convey air that communicates with ports 130 and 138, and a conveying component 152, a tube designed to convey plant growth light that communicates with ports 132 and 144. The containers can be placed side by side with side wall 118 on the grow container 12*b* positioned beside the side wall 134 on the support container 14*b* and with side wall 120 on the grow container 12*c* positioned beside the side wall 140 on the support container 14*b*. With this arrangement, the operation of grow container 12*b* and the left side of support container 14*b* (including conveying components 146 and 150) is similar to the operation of grow container 12*a* and support container 14*a* described above, and thus will not be repeated here.

With continuing reference to all the FIGURES but especially FIG. 20, the operation of grow container 12*c* and support container 14*a* will now be described. Support container port 142 communicates with a port in grow container side wall 120 similar to port 18 in the middle right of FIG. 5 and support container port 144 communicates with a port in grow container side wall 120 similar to port 18 in the upper left of FIG. 5. In operation then, plant growth light may be conveyed from outside the support container 14*b*, through support container port 132, through the conveying component 152, through the support container port 144, through the aligned port in side wall 120 (the port similar to port 18 in the upper left of FIG. 5) and into the plant space 154 of grow container 12*c*. Air may be conveyed by the ventilation fan in grow container 12*c* from outside the support container 14*b*, through support container port 128, through the conveying component 148, through the support container port 142, through the aligned port in side wall 120 (the port similar to port 18 in the middle right of FIG. 5) through the plant space 154 of grow container 12*c* and out through the port in grow container 12*c* near the ventilation fan in side wall 122.

With reference now to FIGS. 1-2, and 16-18, when containers are stacked, note that in some embodiments the plant growth light may travel downward from a light source (which may be a natural light source like the sun or moon or an artificial light source) outside the highest support container 14, through as many light conveying components 66 as necessary, and then sideways into the plant space 16 of a particular grow container 12. In this case, each grow container 12 receives plant growth light from an exclusive tube or tubes. Similarly, when containers are stacked, note that in some embodiments the air may travel sideways from outside a particular grow container 12, across the corresponding plant space 16, then upward through as many air conveying components 68 as necessary, and then out of the highest support container 14. In this case, each grow container 12 vents air through a non-exclusive tube or tubes. As a result, each plant space 16 for each grow container 12 can be easily, yet individually and carefully, controlled to maximize conditions for the particular plants concerned. In yet another embodiment, not shown, a conveying component (whether a light conveying component 66 or an air conveying component 68) may be applied external to a grow container 12, communicating with the corresponding grow container port 18, but independent of a support container 14. In this way, the weight, complexity and cost of a support container may be eliminated.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. Further, the "invention" as that term is used in this document is what is claimed in the claims of this document. The right to claim elements and/or sub-combinations that are disclosed herein as other inventions in other patent documents is hereby unconditionally reserved.

I claim:

1. A modular greenhouse assembly comprising:
   a first grow container that:
   1) has an outer boundary defined by a top, a bottom, and one or more side walls, including a first side wall, that connect the top to the bottom;
   2) has an interior volume of at least 1500 cubic feet;
   3) has a plant space within the outer boundary that is designed to house one or more associated plants;
   4) has a first port formed in the first side wall that communicates with the plant space and that has a cross-section of at least 1 square foot;
   5) has a second port formed in the first side wall that communicates with the plant space and that has a cross-section of at least 1 square foot;
   a second grow container that:
   1) has an outer boundary defined by a top, a bottom, and one or more side walls, including a first side wall, that connect the top to the bottom;
   2) has an interior volume of at least 1500 cubic feet;
   3) has a plant space within the outer boundary that is designed to house one or more associated plants;
   4) has a first port formed in the first side wall that communicates with the plant space and that has a cross-section of at least 1 square foot;
   5) has a second port formed in the first side wall that communicates with the plant space and that has a cross-section of at least 1 square foot;
   6) is designed to support on its top another grow container of the same design;
   a first support container that:
   1) has an outer boundary defined by a top, a bottom, and one or more side walls, including a first side wall, that connect the top to the bottom;
   2) has an interior volume of at least 1500 cubic feet;
   3) has a first conveying component within the outer boundary that is a tube designed to convey plant growth light and that has a minimum cross-section of at least 1 square foot;
   4) has a first port formed in the top that communicates with the first conveying component and that has a cross-section of at least 1 square foot;
   5) has a second port formed in the bottom that communicates with the first conveying component and that has a cross-section of at least 1 square foot;
   6) has a second conveying component within the outer boundary that is a tube designed to convey plant growth light and that has a minimum cross-section of at least 1 square foot;
   7) has a third port formed in the top that communicates with the second conveying component and that has a cross-section of at least 1 square foot;
   8) has a fourth port formed in the first wall that communicates with the second conveying component and that has a cross-section of at least 1 square foot;
   9) has a fifth port formed in the first wall that has a cross-section of at least 1 square foot;
   a second support container that:
   1) has an outer boundary defined by a top, a bottom, and one or more side walls, including a first side wall, that connect the top to the bottom;
   2) has an interior volume of at least 1500 cubic feet;
   3) has a first conveying component within the outer boundary that is a tube designed to convey plant growth light and that has a minimum cross-section of at least 1 square foot;
   4) has a first port formed in the top that communicates with the first conveying component and that has a cross-section of at least 1 square foot;
   5) has a second port formed in the first wall that communicates with the first conveying component and that has a cross-section of at least 1 square foot;
   6) has a third port formed in the first wall that has a cross-section of at least 1 square foot;
   7) is designed to support on its top another support container of the same design;
   wherein the containers are designed to be operable such that when the first grow container is stacked on top of the second grow container, the first support container is stacked on top of the second support container, the first wall of the first grow container is beside the first wall of the first support container, and the first wall of the second grow container is beside the first wall of the second support container:
   1) the first port in the first grow container communicates with the fourth port in the first support container;
   2) the second port in the first grow container communicates with the fifth port in the first support container;
   3) the first port in the second grow container communicates with the second port in the second support container;
   4) the second port in the second grow container communicates with the third port in the second support container;
   5) the second port in the first support container communicates with the first port in the second support container;
   6) plant growth light is conveyed from outside the first support container, through the first port in the first support container, through the first conveying component in the first support container, through the second port in the first support container, through the first port in the second support container, through the first conveying component in the second support container, through the second port in the second support container, through the first port in the second grow container, and into the plant space in the second grow container;

7) plant growth light is conveyed from outside the first support container, through the third port in the first support container, through the second conveying component in the first support container, through the fourth port in the first support container, through the first port in the first grow container, and into the plant space in the first grow container;
8) air is conveyed between the plant space in the first grow container and the interior volume of the first support container via the second port in the first grow container and the fifth port in the first support container;
9) air is conveyed between the plant space in the second grow container and the interior volume of the second support container via the second port in the second grow container and the third port in the second support container.

2. The modular greenhouse assembly of claim 1 further comprising:
a third grow container that:
  1) has an outer boundary defined by a top, a bottom, and one or more side walls, including a first side wall, that connect the top to the bottom;
  2) has an interior volume of at least 1500 cubic feet;
  3) has a plant space within the outer boundary that is designed to house one or more associated plants;
  4) has a first port formed in the first side wall that communicates with the plant space and that has a cross-section of at least 1 square foot;
  5) has a second port formed in the first side wall that communicates with the plant space and that has a cross-section of at least 1 square foot;
  6) is designed to support on its top two other grow containers of the same design;
a third support container that:
  1) has an outer boundary defined by a top, a bottom, and one or more side walls, including a first side wall, that connect the top to the bottom;
  2) has an interior volume of at least 1500 cubic feet;
  3) has a first conveying component within the outer boundary that is a tube designed to convey plant growth light and that has a minimum cross-section of at least 1 square foot;
  4) has a first port formed in the top that communicates with the first conveying component and that has a cross-section of at least 1 square foot;
  5) has a second port formed in the first wall that communicates with the first conveying component and that has a cross-section of at least 1 square foot;
  6) has a third port formed in the first wall that has a cross-section of at least 1 square foot;
  7) is designed to support on its top two other support containers of the same design;
wherein the first support container:
  1) has a third conveying component within the outer boundary that is a tube designed to convey plant growth light and that has a minimum cross-section of at least 1 square foot;
  2) a sixth port formed in the top that communicates with the third conveying component and that has a cross-section of at least 1 square foot;
  3) a seventh port formed in the bottom that communicates with the third conveying component;
wherein the second support container further comprises:
  1) a second conveying component within the outer boundary that is a tube designed to convey plant growth light and that has a minimum cross-section of at least 1 square foot;
  2) a fourth port formed in the top that communicates with the second conveying component and that has a cross-section of at least 1 square foot;
  3) a fifth port formed in the bottom that communicates with the second conveying component and that has a cross-section of at least 1 square foot;
wherein the containers are designed to be operable such that when the first and second grow containers are stacked on top of the third grow container, the first and second support containers are stacked on top of the third support container, and the first wall of the third grow container is beside the first wall of the third support container:
  1) the seventh port in the first support container communicates with the fourth port in the second support container;
  2) the fifth port in the second support container communicates with the first port in the third support container;
  3) the first port in the third grow container communicates with the second port in the third support container;
  4) the second port in the third grow container communicates with the third port in the third support container;
  5) plant growth light is conveyed from outside the first support container, through the sixth port in the first support container, through the third conveying component in the first support container, through the seventh port in the first support container, through the fourth port in the second support container, through the second conveying component in the second support container, through the fifth port in the second support container, through the first port in the third support container, through the first conveying component in the third support container, through the second port in the third support container, through the first port in the third grow container, and into the plant space in the third grow container;
  6) air is conveyed between the plant space in the third grow container and the interior of the third support container via the second port in the third grow container and the third port in the third support container.

3. The modular greenhouse assembly of claim 2 wherein:
the first grow container:
  1) has a third port formed in the outer boundary;
  2) has an air moving device;
the second grow container:
  1) has a third port formed in the outer boundary,
  2) has an air moving device;
the third grow container:
  1) has a third port formed in the outer boundary;
  2) has an air moving device;
the first support container:
  1) has a fourth conveying component within the outer boundary that is a tube designed to convey air and that has a minimum cross-section of at least 1 square foot;
  2) has an eighth port formed in the top that communicates with the fourth conveying component and that has a cross-section of at least 1 square foot;

3) has a ninth port formed in the bottom that communicates with the fourth conveying component and that has a cross-section of at least 1 square foot;

the second support container:
1) has a third conveying component within the outer boundary that is a tube designed to convey air and that has a minimum cross-section of at least 1 square foot;
2) has an sixth port formed in the top that communicates with the third conveying component and that has a cross-section of at least 1 square foot;
3) has a seventh port formed in the bottom that communicates with the third conveying component and that has a cross-section of at least 1 square foot;

the third support container:
1) has a second conveying component within the outer boundary that is a tube designed to convey air and that has a minimum cross-section of at least 1 square foot;
2) has an fourth port formed in the top that communicates with the second conveying component and that has a cross-section of at least 1 square foot;

wherein:
1) the fifth port in the first support container communicates with the fourth conveying component in the first support container;
2) the third port in the second support container communicates with the third conveying component in the second support container;
3) the third port in the third support container communicates with the second conveying component in the third support container;

wherein the containers are designed to be operable such that:
1) the fourth port in the third support container communicates with the seventh port in the second support container;
2) the sixth port in the second support container communicates with the ninth port in the first support container;
3) air is conveyed by the air moving device in the third grow container from outside the third grow container, through the third port in the third grow container, through the plant space in the third grow container, through the second port in the third grow container, through the third port in the third support container, through the second conveying component in the third support container, through the fourth port in the third support container, through the seventh port in the second support container, through the third conveying component in the second support container, through the sixth port in the second support container, through the ninth port in the first support container, through the fourth conveying component in the first support container, and through the eighth port in the first support container;
4) air is conveyed by the air moving device in the second grow container from outside the second grow container, through the third port in the second grow container, through the plant space in the second grow container, through the second port in the second grow container, through the third port in the second support container, through the third conveying component in the second support container, through the sixth port in the second support container, through the ninth port in the first support container, through the fourth conveying component in the first support container, and through the eighth port in the first support container;
5) air is conveyed by the air moving device in the first grow container from outside the first grow container, through the third port in the first grow container, through the plant space in the first grow container, through the second port in the first grow container, through the fifth port in the first support container, through the fourth conveying component in the first support container, and through the eighth port in the first support container.

4. The modular greenhouse assembly of claim 1 wherein:
the first grow container:
1) has a third port formed in the outer boundary;
2) has an air moving device;
the second grow container:
1) has a third port formed in the outer boundary;
2) has an air moving device;
the first support container:
1) has a third conveying component within the outer boundary that is a tube designed to convey air and that has a minimum cross-section of at least 1 square foot;
2) has a sixth port formed in the top that communicates with the third conveying component and that has a cross-section of at least 1 square foot;
3) has a seventh port formed in the bottom that communicates with the third conveying component and that has a cross-section of at least 1 square foot;
the second support container:
1) has a second conveying component within the outer boundary that is a tube designed to convey air and that has a minimum cross-section of at least 1 square foot;
2) has an fourth port formed in the top that communicates with the second conveying component and that has a cross-section of at least 1 square foot;
wherein the third port in the second support container communicates with the second conveying component in the second support container;
wherein a fifth port in the second support container communicates with a third conveying component in the second support container;
wherein the containers are designed to be operable such that:
1) the fourth port in the second support container communicates with the seventh port in the first support container;
2) air is conveyed by the air moving device in the second grow container from outside the second grow container, through the third port in the second grow container, through the plant space in the second grow container, through the second port in the second grow container, through the third port in the second support container, through the second conveying component in the second support container, through the fourth port in the second support container, through the seventh port in the first support container, through the third conveying component in the first support container, and through the sixth port in the first support container;
3) air is conveyed by the air moving device in the first grow container from outside the first grow container, through the third port in the first grow container, through the plant space in the first grow container, through the second port in the first grow container, through the fifth port in the first support container, through the third conveying component in the first support container, and through the sixth port in the first support container.

5. The modular greenhouse assembly of claim 1 wherein:
the first conveying component within the first support container is designed to convey plant growth light comprising natural light;
the second conveying component within the first support container is designed to convey plant growth light comprising natural light;
the first conveying component within the second support container is designed to convey plant growth light comprising natural light;
the containers are designed to be operable to convey the plant growth light comprising natural light from outside the first support container, through the first port in the first support container, through the first conveying component in the first support container, through the second port in the first support container, through the first port in the second support container, through the first conveying component in the second support container, through the second port in the second support container, through the first port in the second grow container, and into the plant space in the second grow container;
the containers are designed to be operable to convey the plant growth light comprising natural light from outside the first support container, through the third port in the first support container, through the second conveying component in the first support container, through the fourth port in the first support container, through the first port in the first grow container, and into the plant space in the first grow container.

6. The modular greenhouse assembly of claim 1 further comprising:
at least one artificial plant growth light source;
wherein the first conveying component within the first support container is designed to convey plant growth light comprising artificial light;
wherein the second conveying component within the first support container is designed to convey plant growth light comprising artificial light;
wherein the first conveying component within the second support container is designed to convey plant growth light comprising artificial light;
wherein the containers are designed to be operable to convey the plant growth light comprising artificial light from outside the first support container, through the first port in the first support container, through the first conveying component in the first support container, through the second port in the first support container, through the first port in the second support container, through the first conveying component in the second support container, through the second port in the second support container, through the first port in the second grow container, and into the plant space in the second grow container;
wherein the containers are designed to be operable to convey the plant growth light comprising artificial light from outside the first support container, through the third port in the first support container, through the second conveying component in the first support container, through the fourth port in the first support container, through the first port in the first grow container, and into the plant space in the first grow container.

7. The modular greenhouse assembly of claim 1 wherein:
the first grow container is a rectangular prism;
the second grow container is a rectangular prism;
the first support container is a rectangular prism;
the second support container is a rectangular prism.

8. The modular greenhouse assembly of claim 7 wherein:
the first and second grow containers have the same size and shape;
the first and second support containers have the same size and shape.

9. The modular greenhouse assembly of claim 1 wherein:
each port formed in one of the side walls is positioned within a removable wall panel.

10. The modular greenhouse assembly of claim 1 wherein:
a first vertically extending ladder is provided within the outer boundary of the first support container;
a second vertically extending ladder is provided within the outer boundary of the second support container;
the containers are designed to be operable such that when the first support container is stacked on top of the second support container, the first ladder communicates with the second ladder, enabling an associated user to move on the ladders between the first and second support containers.

11. The modular greenhouse assembly of claim 1 wherein:
each container has a door in its outer boundary,
the first support container has a water connection that supplies water to the plant space within the first grow container;
the second support container has a water connection that supplies water to the plant space within the second grow container.

\* \* \* \* \*